(12) United States Patent
Johnston et al.

(10) Patent No.: US 8,433,659 B2
(45) Date of Patent: *Apr. 30, 2013

(54) SYSTEMS AND METHODS FOR DETERMINING ESTIMATED LEAD TIMES

(75) Inventors: Ann Marie Johnston, Lewis Center, OH (US); Robert Charles Esque, Bexley, OH (US); Justin Jackson, Lewis Center, OH (US); Brian Richard Seemann, Galena, OH (US); Roy Alan Southard, West Liberty, OH (US)

(73) Assignee: Fiserv, Inc., Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,959

(22) Filed: Jul. 20, 2012

(65) Prior Publication Data

US 2012/0290475 A1     Nov. 15, 2012

Related U.S. Application Data

(63) Continuation of application No. 12/481,353, filed on Jun. 9, 2009, now Pat. No. 8,244,646.

(51) Int. Cl.
    *G06Q 30/00* (2006.01)
(52) U.S. Cl.
    USPC .............................. 705/330; 705/341; 705/1.1
(58) Field of Classification Search ............... 705/1, 1.1, 705/330, 341
    See application file for complete search history.

(56) References Cited

U.S. PATENT DOCUMENTS

| | | |
|---|---|---|
| 3,761,682 A | 9/1973 | Barnes et al. |
| 3,833,885 A | 9/1974 | Gentile et al. |
| 3,876,864 A | 4/1975 | Clark et al. |
| 3,949,364 A | 4/1976 | Clark et al. |
| 4,270,042 A | 5/1981 | Case |
| 4,321,672 A | 3/1982 | Braun et al. |
| 4,484,328 A | 11/1984 | Schlafly |

(Continued)

FOREIGN PATENT DOCUMENTS

| | | |
|---|---|---|
| JP | 401195573 A | 8/1989 |
| WO | 9109370 | 6/1991 |

OTHER PUBLICATIONS

Non-Final Office Action for U.S. Appl. No. 12/481,281 mailed Sep. 22, 2011.

(Continued)

*Primary Examiner* — John Hayes
*Assistant Examiner* — Michael Harrington
(74) *Attorney, Agent, or Firm* — Sutherland Asbill & Brennan LLP

(57) ABSTRACT

Embodiments of the invention may provide systems and methods for determining estimated lead times based on delivery history information to a same or similar geographical area. According to one example embodiment, a method is provided. The method can include identifying a payee and determining that the payee is associated with a geographical area for mailpiece delivery. The method can further include identifying multiple delivery methods for mailpiece delivery to the geographical area, wherein each of delivery methods is associated with (a) a distribution center, (b) a delivery agent, and (c) an estimated lead time determined at least in part by analyzing the delivery history information associated with multiple mailpieces mailed from the respective distribution center to the geographical area via the respective delivery agent. The method can further include selecting one of the delivery methods for mailpiece delivery to the payee and associating the selected delivery method with the payee.

35 Claims, 10 Drawing Sheets

U.S. PATENT DOCUMENTS

| | | | |
|---|---|---|---|
| 4,642,767 A | 2/1987 | Lerner | |
| 4,649,563 A | 3/1987 | Riskin | |
| 4,734,858 A | 3/1988 | Schlafly | |
| 4,745,559 A | 5/1988 | Willis et al. | |
| 4,758,714 A | 7/1988 | Carlson et al. | |
| 4,791,561 A | 12/1988 | Huber | |
| 4,799,156 A | 1/1989 | Shavit et al. | |
| 4,823,264 A | 4/1989 | Deming | |
| 4,882,675 A | 11/1989 | Nichtberger et al. | |
| 4,926,325 A | 5/1990 | Benton et al. | |
| 4,929,818 A | 5/1990 | Bradbury et al. | |
| 4,947,028 A | 8/1990 | Gorog | |
| 4,948,174 A | 8/1990 | Thomson et al. | |
| 4,960,981 A | 10/1990 | Benton et al. | |
| 4,961,139 A | 10/1990 | Hong et al. | |
| 4,974,878 A | 12/1990 | Josephson | |
| 5,007,084 A | 4/1991 | Materna et al. | |
| 5,025,373 A | 6/1991 | Keyser, Jr. et al. | |
| 5,093,787 A | 3/1992 | Simmons | |
| 5,097,115 A | 3/1992 | Ogasawara et al. | |
| 5,111,395 A | 5/1992 | Smith et al. | |
| 5,121,945 A | 6/1992 | Thomson et al. | |
| 5,220,501 A | 6/1993 | Lawlor et al. | |
| 5,237,159 A | 8/1993 | Stephens et al. | |
| 5,265,008 A | 11/1993 | Benton et al. | |
| 5,283,829 A | 2/1994 | Anderson | |
| 5,303,149 A | 4/1994 | Janigian | |
| 5,326,959 A | 7/1994 | Perazza | |
| 5,336,870 A | 8/1994 | Hughes et al. | |
| 5,383,113 A | 1/1995 | Kight et al. | |
| 5,420,405 A | 5/1995 | Chasek | |
| 5,465,206 A | 11/1995 | Hilt et al. | |
| 5,496,991 A | 3/1996 | Delfer, III et al. | |
| 5,504,677 A | 4/1996 | Pollin | |
| 5,652,786 A | 7/1997 | Rogers | |
| 5,677,955 A | 10/1997 | Doggett et al. | |
| 5,699,528 A | 12/1997 | Hogan | |
| 5,710,889 A | 1/1998 | Clark et al. | |
| 5,727,249 A | 3/1998 | Pollin | |
| 5,794,221 A | 8/1998 | Egendorf | |
| 5,873,072 A | 2/1999 | Kight et al. | |
| 5,884,288 A | 3/1999 | Chang et al. | |
| 5,920,847 A | 7/1999 | Kolling et al. | |
| 5,920,848 A | 7/1999 | Schutzer et al. | |
| 5,956,700 A | 9/1999 | Landry | |
| 5,966,698 A | 10/1999 | Pollin | |
| 5,974,146 A | 10/1999 | Randle et al. | |
| 5,978,780 A | 11/1999 | Watson | |
| 6,029,150 A | 2/2000 | Kravitz | |
| 6,032,133 A | 2/2000 | Hilt et al. | |
| 6,044,362 A | 3/2000 | Neely | |
| 6,098,053 A | 8/2000 | Slater | |
| 6,188,994 B1 | 2/2001 | Egendorf | |
| 6,311,170 B1 | 10/2001 | Embrey | |
| 6,317,745 B1 | 11/2001 | Thomas et al. | |
| 7,107,244 B2 | 9/2006 | Kight et al. | |
| 7,212,975 B2 | 5/2007 | Bantz et a | |
| 7,251,612 B1 | 7/2007 | Parker et al. | |
| 7,536,321 B2 | 5/2009 | Takahashi et al. | |
| 7,702,585 B2 | 4/2010 | Lyda et al. | |
| 7,930,248 B1 | 4/2011 | Lawson et al. | |
| 7,996,328 B1 | 8/2011 | Lundberg et al. | |
| 8,244,646 B2 | 8/2012 | Johnston et al. | |
| 2001/0037295 A1 | 11/2001 | Olsen | |
| 2002/0002537 A1 | 1/2002 | Bastiansen | |
| 2002/0116331 A1 | 8/2002 | Cataline et al. | |
| 2003/0191714 A1 | 10/2003 | Norris | |
| 2003/0208445 A1 | 11/2003 | Compiano | |
| 2004/0015413 A1 | 1/2004 | Abu-Hejleh et al. | |
| 2005/0149344 A1 | 7/2005 | Wachholz-Prill | |
| 2005/0171856 A1 | 8/2005 | Takahashi et al. | |
| 2006/0136237 A1 | 6/2006 | Spiegel et al. | |
| 2006/0235739 A1 * | 10/2006 | Levis et al. | 705/9 |
| 2008/0154414 A1 | 6/2008 | Lokowandt et al. | |
| 2009/0076933 A1 | 3/2009 | Park et al. | |
| 2009/0125355 A1 | 5/2009 | Handel et al. | |
| 2009/0210140 A1 | 8/2009 | Short, III et al. | |
| 2009/0248470 A1 | 10/2009 | Pintsov et al. | |
| 2009/0265223 A1 | 10/2009 | Takahashi et al. | |
| 2010/0100462 A1 | 4/2010 | Lyda et al. | |
| 2010/0114669 A1 | 5/2010 | Birjandi | |
| 2010/0125514 A1 | 5/2010 | Blackhurst et al. | |
| 2011/0145095 A1 | 6/2011 | Giesler et al. | |

OTHER PUBLICATIONS

Non-Final Office Action for U.S. Appl. No. 12/481,353 mailed Nov. 10, 2011.

Final Office Action for U.S. Appl. No. 12/481,281 mailed Feb. 2, 2012.

Notice of Allowance for U.S. Appl. No. 12/481,353 mailed Apr. 9, 2012.

"ABA Routing Numbers." From www.aba.com (Website of the American Bankers Association) (c) 2006.

"Banks, Credit Unions Join in Utilities to Expand Bill Payment Plan." Press Release. Omaha World-Herald (Sunrise Edition), Aug. 30, 1989.

"Federal Reserve System Docket No. R-0643, Regulation CC CFR Part 2 29, Availability of Funds and Collection of Checks." Press Release. American Banker, Oct. 27, 1988, vol. 153, issue 211.

"Myte Myke Business System: Order Entry Billing," Product Literature. Abstract from Microsearch file of Orbit, AN:87-039522.

"Official Routing No. Registrar—Routing Number Policy." Formulated jointly by the American Bankers Association and the Federal Reserve System, 1976, pp. 1-22.

"Is Video Banking Poised to Take Off (Again)?" CTS Accounting Software Survey, Jun. 1990, vol. 20, issue 1.

Excerpt from the Bankers Magazine, Jul.-Aug. 1985, pp. 54-55.

Advertisement: as seen in PC Computing. "CheckFree, the Fastest Way to Pay Bills," with purchase order form. Reprinted from PC Magazine, Nov. 14, 1989.

Blattberg, Robert C., and John Deighton. "Interactive Marketing: Exploiting the Age of Addressability." Sloan Management Review, Fall 1991, pp. 5-14, vol. 13, No. 1.

Churbuck, David C. "Let Your Fingers Do the Banking." Forbes, Aug. 19, 1991.

Crossman, Craig. "Paying Bills Can Be an Electronic Task." Miami Herald, Mar. 12, 1990.

Dunkin, Amy. "Personal Business: Software, Have a PC? Now You Can Chuck Your Checkbook." Business Week, Sep. 3, 1990.

Eliason, A.L. Online Business Computer Applications (2nd edition), pp. 18-19 and 69-71. Science Research Associates, USA, 1987.

Francis, G. Jay et al. Excerpts from "Chapter 6: the Payment Function—Routing Symbol and Transit Number." Principles of Banking, p. 109, American Bankers Association, 1998.

Gullo, Karen. "Reistad Continues Quest for the 'Checkless Society,' Series: 8." American Banker, Jul. 16, 1991, vol. 156, issue 135.

Hines, Tracie Forman. "The Check is in the Modem." MacUser, Jan. 1985, vol. 1, No. 1.

Howard, Bill. "The Best of 1989." PC Magazine, Jan. 16, 1990.

Huiyong et al. "Harbrace Considers Sale of Some Assets—Chief Says Firm Discussing Potential Transactions; Thomson May Play Role." Wall Street Journal, Apr. 26, 1990.

Lewis, Peter H. "Personal Computers: Managing Your Money." New York Times, Aug. 29, 1989.

Magid, Lawrence J. "Pay Your Bills the PcC Way." St. Louis Post Dispatch, Jul. 31, 1989.

Magid, Lawrence. "How to Put PC to Work Paying Bills." Los Angeles Times, Jul. 25, 1991.

Malnig, Anita. "Roundup of Financial Software: Home Accountant." II Computing, Feb. 1990, pp. 73-74, vol. 1, No. 3.

Merriam-Webster's Collegiate Dictionary, 10th edition, p. 293, word, "database" (1962); and p. 929, word, "processing" (1532).

Paschal, Jan. "New Edition of Rand McNally Bankers Directory Available." Journal Record, Feb. 11, 1987, Oklahoma City. Extracted on Internet from http://proquest.umi.com.

Rae, Sharon Gamble. "Electronic Checkbook." MacIntosh Buyer's Guide, May 1985, p. 128.

Shipley, Chris. "CheckFree's Payment System." PC Computing, Aug. 1, 1991.

Shipley, Chris. "Electronic Bill Paying Just Got a Lot Easier." PC Computing, May 1, 1991.

Shipley, Chris. "I Threw Away My Checkbook." PC Computing, Nov. 1990, p. 112, vol. 3, No. 11.

Steinberg, Jeffrey A. "CheckFree." MacUser, Aug. 1990, p. 68, vol. 6, No. 8.

Streeter, Bill. "The Future is Here and It's on TV." ABA Banking Journal, Nov. 1980. Extracted on Internet from Corporate Business Source database.

Declaration by Mark Johnson.

Tripp, Julie. "How to Lend Uncle Sam Your Money." The Oregonian, Oct. 28, 1990, p. B1, Portland, OR. Extracted on Internet from http://proquest.umi.com.

Tyson, David O. "Princeton Telecom Addresses Problems of On-Line Bill Payment." American Banker, Aug. 1989, vol. 154, No. 154.

White et al. "4-in-1 Accounting: The Basics from Real-World." PC Magazine Oct. 1, 1985 pp. 167-168 vol. 4 No. 20. Extracted on Internet from Dialog file 47 Accession #02746427.

Willumstad Robert B. "Home Banking: A Case Study." Banker's Magazine Nov.-Dec. 1984 pp. 4R 55.

Disclosure under 37 C.F.R. §1.56.

* cited by examiner

SYSTEMS AND METHODS FOR DETERMINING ESTIMATED LEAD TIMES

CROSS-REFERENCE TO RELATED APPLICATIONS

This application is a continuation of co-pending U.S. application Ser. No. 12/481,353, filed Jun. 9, 2009, the content of which is incorporated by reference herein in its entirety.

FIELD OF THE INVENTION

Aspects of the invention relate generally to bill payment, and more particularly to systems and methods for determining estimated lead times for delivering paper instruments.

BACKGROUND OF THE INVENTION

Financial institutions and payees often provide online services to their customers, many of which may be performed at least in part via payment service providers. In one example, payment service providers can complete payment transactions to payees on behalf of a payor, which may also be a customer (also referred to as a "subscriber") of the payment service provider. A payment service provider typically receives a payment request and then will typically either print and mail payments to the payee or process the payments electronically.

Payors may manage the timing of making payments, such as to retain control of funds as long as possible, to avoid late payments, and to coordinate with available funds or cash flow. Similarly, payment service providers also desire to control the timing of issuing payments on behalf of their customers and/or the delivery methods used.

BRIEF DESCRIPTION OF THE DRAWINGS

Reference will now be made to the accompanying drawings, which are not necessarily drawn to scale, and wherein.

DETAILED DESCRIPTION

Figure 1:
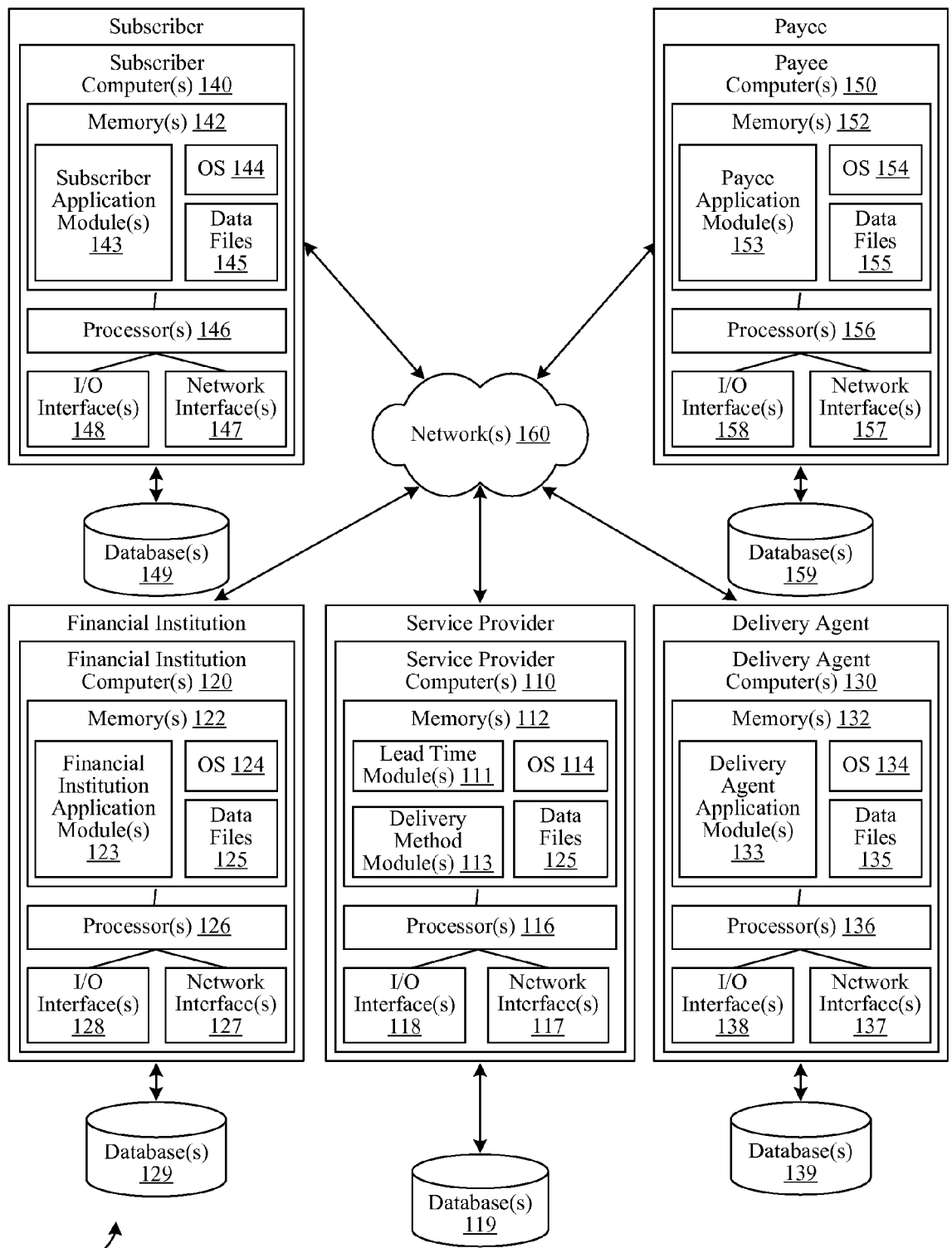
FIG. 1 illustrates an overview of an example system for estimating lead times and selecting delivery methods, according to an example embodiment of the invention.

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide for estimating payment lead times for paper instruments for a payee based on delivery history information associated with the delivery of mailpieces between one or more distribution centers and a same or similar geographical area as the payee's geographical area (e.g., zip code). The delivery history information can include at least a mail date and receipt date, or other data indicating when the receipt date may have been (e.g., check clearance date), which allows a delivery time for each of the mailpieces represented in the delivery history information to be calculated. Accordingly, by analyzing delivery times for prior mailings to the payee's geographical area, an estimated lead time for mailing a paper instrument or other mailpiece to the analyzed geographical area can be determined. Moreover, by focusing on the geographical area to determine estimated lead times, delivery history information can be considered from multiple payees or other recipients, and the estimated lead time determined can be representative of lead times for delivering mailpieces to multiple payees or to other recipients in that same geographical area.

According to various embodiments, providing more accurate estimates for payment lead times can permit a subscriber to submit a payment request closer to the delivery date, thus allowing the subscriber to retain a greater balance for a longer duration of time and/or benefit from increased interest generation. Having accurate lead times available also permits subscribers to time their payments based on cash flow, available balances, or personal preferences, for example. In addition, unnecessarily early deliveries of paper instrument-based payments can be avoided by providing a more accurate lead time estimate, allowing a payment service provider (also referred to interchangeably herein as a "service provider") to better time the printing and delivery of paper instrument payments, such as to maintain a higher balance and benefit from increased interest generation.

Delivery methods for delivering paper instruments can vary according to numerous factors, including, but not limited to, the distribution centers from which paper instruments are mailed, the delivery agents used for delivery, the transportation means and/or priority services requested, and the like. Each different delivery method may have a different lead time associated therewith. Therefore, according to one embodiment, more accurate estimated lead times can permit a payment service provider to select the preferred delivery method for mailing paper instrument payments. In addition to estimated lead times, other characteristics and factors associated with various available delivery methods (e.g., cost, delivery agent preferences, distribution center preferences or availability, delivery timing, subscriber permissions, etc.) can be collected from delivery history information associated with mailpieces delivered to the same or similar geographical areas. These additional delivery method characteristics can also be considered by a service provider when selecting a delivery method for delivery of mailpieces.

As used herein, the term "subscriber" generally refers to an individual, business, or any other entity that uses electronic bill presentment and payment applications, such as may be provided by one or more service providers. Also as used herein, the term "payor" generally refers to a subscriber requesting or otherwise providing payment to another business, individual, or other entity. Thus, the term "payee" generally refers to a business, individual, or other entity receiving payment, such as may be received via an electronic payment application provided by one or more service providers. The term "service provider" generally refers to an entity operable to process payments on behalf of a payee or subscriber. A service provider may process payments on behalf of individuals, organizations, or any other entities. Payment requests can be received by a service provider directly from a subscriber, or from any other entity on behalf of a subscriber. Though, according to some embodiments, a service provider is not limited to a payment service provider, and can generally refer to any entity facilitating transactions with other entities on behalf of its customers.

I. System Overview

FIG. 1 illustrates an example system 100 for estimating payment lead times and selecting delivery methods, according to an example embodiment of the invention. Although various computing devices and/or computers are illustrated in FIG. 1, it is appreciated that corresponding entities and/or individuals are associated with each of the computers illustrated. According to various embodiments, there may be: one or more service providers, each associated with one or more service provider computers 110; one or more financial institutions (e.g., bank), each associated with one or more financial institution computers 120; one or more delivery agents (e.g., postal carrier, shipping company, etc.), each associated with one or more delivery agent computers 130; one or more subscribers (e.g., payee, bank, and/or service provider customers), each associated with one or more subscriber computers 140; and one or more payees (e.g., billers, each associated with one or more payee computers 150. According to various embodiments, there may be any number of each entity type, and each entity may be associated with multiple computers. For simplicity, the computers and/or entities may be referenced in the singular, but it is appreciated that the same description applies to embodiments including multiple computers and/or entities. Similarly, for each of the computers described herein, it is appreciated that there may be any number of the various components and features of each of the computers (e.g., multiple processors, memory elements, application modules, etc.), but each may be referred to herein in the singular for simplicity.

As shown in FIG. 1, a service provider computer 110, one or more financial institution computers 120, one or more delivery agent computers 130, one or more subscriber computers 140, and one or more payee computers 150 may be in communication with each other via a network 160, which, as described below, can include one or more separate or shared private and/or public networks, including the Internet or a publicly switched telephone network. More specifically, according to various embodiments, the service provider computer(s) 110 can be operable to receive check clearing information from one or more of the financial institution computers 120 or one or more of the payee computers 150 and/or mailpiece delivery status information from one or more delivery agent computers 130. The service provider computer(s) 110 is operable to analyze the check clearing information and/or the mailpiece delivery status information to determine estimated lead times for delivering mailpieces to the same or similar geographical area. The service provider computer(s) 110 can also be operable to communicate to one or more subscriber computers 140 and/or one or more payee computers 150 estimated lead times associated with payees and/or respective payments. According to various embodiments, estimated lead times can be communicated to any other entity illustrated by FIG. 1 or not, such as a consumer service provider for the subscriber that is operable to present the user interface or other features of the services to the subscriber (which may be a financial institution or other entity). The service provider computer(s) 110 can also be operable to analyze various available delivery methods and associated characteristics to select a delivery method from available delivery methods for delivery to a given geographical area. Each of these components—the one or more service provider computers 110, the one or more financial institution computers 120, the one or more delivery agent computers 130, the one or more subscriber computers 140, the one or more payee computers 150, and the network 160—will now be discussed in further detail.

First, each of the one or more service provider computer(s) 110 may be any processor-driven device, such as, but not limited to, a server computer, a mainframe computer, one or more networked computers, a desktop computer, a personal computer, a laptop computer, a mobile computer, or any other processor-based device. In addition to having one or more processors 116, the service provider computer 110 may further include one or more memory(s) 112, one or more input/output ("I/O") interface(s) 118, and one or more network interface(s) 117. The memory(s) 112 may be any computer-readable medium, coupled to the processor(s) 116, such as RAM, ROM, and/or a removable storage device for storing data files 115 and operable with one or more associated database management systems ("DBMS") to facilitate management of data files 115 and other data stored in the memory(s) 112 and/or stored in one or more separate database(s) 119 and associated hardware (illustrated collectively as a "database"). The memory(s) 112 may also store various program modules, such as an operating system ("OS") 114, one or more lead time module(s) 111, one or more delivery method module(s) 113, and any other computer software as may typically be executed by or otherwise included with a computer device (e.g., drivers, toolkits, middleware, application packages, file manager, browser, etc.). The OS 114 may be, but is not limited to, Microsoft Windows®, Apple OSX™, Unix, a mainframe computer operating system (e.g., IBM z/OS, MVS, OS/390 earlier, etc.), or a specially designed operating system. The lead time module(s) 111 may comprise computer-executable program instructions or software for receiving, storing, extracting, managing, processing, and analyzing delivery history information to facilitate estimating payment lead times from given distribution centers or other senders to given geographical areas (e.g., zip codes). The delivery method module(s) 113 may comprise computer-executable program instructions or software for extracting lead time estimation information, such as may be determined by the lead time module 111, and additional delivery characteristics, such as may be received by the service provider computer 110, delivery agent computer(s) 130, and/or any other entity, for analyzing various delivery method options and selecting a delivery method from the available delivery methods.

Still referring to the service provider computer(s) 110, the I/O interface(s) 118 may facilitate communication between the processor 116 and various I/O devices, such as a keyboard, mouse, printer, microphone, speaker, monitor, barcode readers/scanners, RFID readers, and the like. The network interface(s) 117 may take any of a number of forms, such as, but not limited to, a network interface card, a modem, a wireless network card, a cellular network card, and the like. Indeed, the service provider computer 110 can receive delivery history information via network interface(s) 117 and additionally transmit estimated lead time information, perhaps, but not limited to, to a subscriber computer 140, via the network interface(s) 117. It will be appreciated that service provider computer(s) 110 may be implemented as a particular machine, which may include a computer that is designed, customized, configured, or programmed to perform at least one or more functions of the lead time module 111 and/or the delivery method module 113, according to an example embodiment of the invention.

Second, each of the one or more financial institution computer(s) 120 may be any processor-driven device, such as, but not limited to, a server computer, a mainframe computer, one or more networked computers, a desktop computer, a personal computer, a laptop computer, a mobile computer, or any other processor-based device. In addition to having one or more processors 126, the financial institution computer(s) 120 may further include one or more memory(s) 122, one or more input/output ("I/O") interface(s) 128, and one or more network interface(s) 127. The memory(s) 122 may be any computer-readable medium, coupled to the processor 126, such as RAM, ROM, and/or one or more removable storage device(s) for storing data files 125, operable with one or more associated database management systems ("DBMS") to facilitate management of data files 125 and other data stored in the memory 122 and/or stored in one or more separate database(s) 129 and associated hardware (illustrated collectively as a "database"). The memory(s) 122 may also store various program modules, such as an operating system ("OS") 124, one or more financial institution application module(s) 123, and any other computer software as may typically be executed by or otherwise included with a computer device (e.g., drivers, toolkits, middleware, application packages, file manager, browser, etc.). The OS 124 may be, but is not limited to, Microsoft Windows®, Apple OSX™, Unix, a mainframe computer operating system (e.g., IBM z/OS, MVS, OS/390 earlier, etc.), or a specially designed operating system. The financial institution application module(s) 123 may comprise computer-executable program instructions or software, including a dedicated program, to facilitate operations of the financial institution with which it is associated. In one example, the financial institution application module(s) 123 can provide information to the service provider computer(s) 110 regarding the date/time at which one or more checks cleared with the respective financial institution.

Still referring to the financial institution computer(s) 120, the I/O interface(s) 128 may facilitate communication between the processor(s) 126 and various I/O devices, such as a keyboard, mouse, printer, microphone, speaker, monitor, barcode readers/scanners, RFID readers, and the like. The network interface(s) 127 may take any of a number of forms, such as, but not limited to, a network interface card, a modem, a wireless network card, a cellular network card, and the like. Indeed, the financial institution computer(s) 120 can transmit check clearance information to any other entity computer, such as, but not limited to, the service provider computer(s) 110 via network interface(s) 127. It will be appreciated that the financial institution computer(s) 120 may be implemented as a particular machine, which may include a computer that is designed, customized, configured, or programmed to perform at least one or more functions of the financial institution application module(s) 123, according to an example embodiment of the invention.

Third, each of the one or more delivery agent computer(s) 130 may be any processor-driven device, such as, but not limited to, a server computer, a mainframe computer, one or more networked computers, a desktop computer, a personal computer, a laptop computer, a mobile computer, or any other processor-based device. In addition to having one or more processor(s) 136, the delivery agent computer(s) 130 may further include one or more memory(s) 132, one or more input/output ("I/O") interface(s) 138, and one or more network interface(s) 137. The memory(s) 132 may be any computer-readable medium, coupled to the processor(s) 136, such as RAM, ROM, and/or one or more removable storage device(s) for storing data files 135 and operable with one or more associated database management systems ("DBMS") to facilitate management of data files 135 and other data stored in the memory 132 and/or stored in one or more separate database(s) 139 and associated hardware (illustrated collectively as a "database"). The memory(s) 132 may also store various program modules, such as an operating system ("OS") 134, one or more delivery agent application module(s) 133, and any other computer software as may typically be executed by or otherwise included with a computer device (e.g., drivers, toolkits, middleware, application packages, file manager, browser, etc.). The OS 134 may be, but is not limited to, Microsoft Windows®, Apple OSX™, Unix, a mainframe computer operating system (e.g., IBM z/OS, MVS, OS/390 earlier, etc.), or a specially designed operating system. The delivery agent application module(s) 133 may comprise computer-executable program instructions or software to facilitate the operations of the delivery agent. For example, the delivery agent application module(s) 133 can be operable to transmit delivery information to the service provider computer(s) 110 for analysis to estimate payment lead times (in addition to, or instead of, check clearance information transmitted from the financial institution computer(s) 120). The delivery agent application module 133 can also be operable to transmit additional delivery characteristics associated with mailpiece deliveries to the service provider computer 110 for analysis to select preferred delivery methods for various circumstances.

Still referring to the delivery agent computer(s) 130, the I/O interface(s) 138 may facilitate communication between the processor(s) 136 and various I/O devices, such as a keyboard, mouse, printer, microphone, speaker, monitor, barcode readers/scanners, RFID readers, and the like. The network interface(s) 137 may take any of a number of forms, such as, but not limited to, a network interface card, a modem, a wireless network card, a cellular network card, and the like. Indeed, the delivery agent computer(s) 130 can transmit mailpiece delivery status information and/or delivery method characteristics to the service provider computer 110, or any other system, via network interface(s) 137. It will be appreciated that delivery agent computer(s) 130 may be implemented as a particular machine, which may include a computer that is designed, customized, configured, or programmed to perform at least one or more functions of the delivery agent application module(s) 133, according to an example embodiment of the invention.

Fourth, each of the one or more subscriber computer(s) 140 may be any processor-driven device, such as, but not limited to, a server computer, a mainframe computer, one or more networked computers, a desktop computer, a personal computer, a laptop computer, a mobile computer, or any other processor-based device. In addition to having one or more processor(s) 146, the subscriber computer(s) 140 may further include one or more memory(s) 142, one or more input/output ("I/O") interface(s) 148, and one or more network interface(s) 147. The memory(s) 142 may be any computer-readable medium, coupled to the processor(s) 146, such as RAM, ROM, and/or a removable storage device for storing data files 145 and operable with one or more associated database management systems ("DBMS") to facilitate management of data files 145 and other data stored in the memory 142 and/or stored in one or more separate database(s) 149 and associated hardware (illustrated collectively as a "database"). The memory(s) 142 may also store various program modules, such as an operating system ("OS") 144, a subscriber application module 143, and any other computer software as may typically be executed by or otherwise included with a computer device (e.g., drivers, toolkits, middleware, application packages, file manager, browser, etc.). The OS 144 may be, but is not limited to, Microsoft Windows®, Apple OSX™, Unix, a mainframe computer operating system (e.g., IBM z/OS, MVS, OS/390 earlier, etc.), or a specially designed operating system. The subscriber application module 143 may comprise computer-executable program instructions or software for accessing electronic bill presentment and payment applications, such as an online payment application hosted or otherwise provided by the service provider computer(s) 110, which can be accessible over the network 160, such as via an Internet browser program running on the subscriber computer(s) 140.

Still referring to the subscriber computer(s) 140, the I/O interface(s) 148 may facilitate communication between the processor(s) 146 and various I/O devices, such as a keyboard, mouse, printer, microphone, speaker, monitor, barcode readers/scanners, RFID readers, and the like. The network interface(s) 147 may take any of a number of forms, such as, but not limited to, a network interface card, a modem, a wireless network card, a cellular network card, and the like. Indeed, the subscriber computer(s) 140 can access an electronic bill presentment and payment application operated by the service provider computer(s) 110, or by any other entity, via network interface(s) 147. It will be appreciated that the subscriber computer 140 may be implemented as a particular machine, which may include a computer that is designed, customized, configured, or programmed to perform at least one or more functions of the subscriber application module(s) 143, according to an example embodiment of the invention.

Fifth, each of the one or more payee computer(s) 150 may be any processor-driven device, such as, but not limited to, a server computer, a mainframe computer, one or more networked computers, a desktop computer, a personal computer, a laptop computer, a mobile computer, or any other processor-based device. In addition to having one or more processor(s) 156, the payee computer(s) 150 may further include one or more memory(s) 152, one or more input/output ("I/O") interface(s) 158, and one or more network interface(s) 157. The memory(s) 152 may be any computer-readable medium, coupled to the processor(s) 156, such as RAM, ROM, and/or one or more removable storage device(s) for storing data files 155 and operable with one or more associated database management systems ("DBMS") to facilitate management of data files 155 and other data stored in the memory(s) 152 and/or stored in one or more separate database(s) 159 and associated hardware (illustrated collectively as a "database"). The memory(s) 152 may also store various program modules, such as an operating system ("OS") 154, one or more payee application module(s) 153, and any other computer software as may typically be executed by or otherwise included with a computer device (e.g., drivers, toolkits, middleware, application packages, file manager, browser, etc.). The OS 154 may be, but is not limited to, Microsoft Windows®, Apple OSX™, Unix, a mainframe computer operating system (e.g., IBM z/OS, MVS, OS/390 earlier, etc.), or a specially designed operating system. The payee application module(s) 153 may comprise computer-executable program instructions or software to facilitate the operations of the payee with which it is associated. According to one embodiment, the payee application module(s) 153 can be operable to process payments, which may facilitate triggering the transmittal of check clearance information to the service provider computer(s) 110 for analysis to estimate payment lead times for the respective payees' geographical areas.

Still referring to the payee computer(s) 150, the I/O interface(s) 158 may facilitate communication between the processor(s) 156 and various I/O devices, such as a keyboard, mouse, printer, microphone, speaker, monitor, barcode readers/scanners, RFID readers, and the like. The network interface(s) 157 may take any of a number of forms, such as, but not limited to, a network interface card, a modem, a wireless network card, a cellular network card, and the like. Indeed, the payee computer(s) 150 can receive payment information from the subscriber computer 140, or any other system, such as notification of an electronic or paper instrument payment, and, optionally, transmit payment information to the service provider computer 110, or any other system, via network interface(s) 157. It will be appreciated that payee computer(s) 150 may be implemented as a particular machine, which may include a computer that is designed, customized, configured, or programmed to perform at least one or more functions of the payee application module(s) 153, according to an example embodiment of the invention.

The network 160 may include any telecommunication and/or data network, whether public, private, or a combination thereof, including a local area network, a wide area network, an intranet, the Internet, a private network link, a publicly switched telephone network ("PSTN"), a cellular network, and/or any combination thereof and may be wired and/or wireless. The network 160 may also allow for synchronous and/or asynchronous transactions to be transmitted in batch and/or transactional modes between or among the service provider computer(s) 110, the financial institution computer(s) 120, the delivery agent computer(s) 130, the subscriber computer(s) 140, and/or the payee computer(s) 150. Due to network connectivity, various methodologies as described herein may be practiced in the context of distributed computing environments. It will also be appreciated that the network 160 may include a plurality of networks, each with devices such as gateways and routers for providing connectivity between or among the networks 160. Instead of, or in addition to, a network 160, dedicated communication links may be used to connect the various devices in accordance with an example embodiment of the invention.

Generally, each of the memories and data storage devices, such as the memories 112, 122, 132, 142, 152 and/or any other memory or data storage device, can facilitate the storage of data and information, such as data files 115, 125, 135, 145, and/or 155, and/or databases 119, 129, 139, 149, and 159, for subsequent retrieval. In this manner, the system 100 can store various received or collected information in memory, such as in internal data files and/or databases, or external computers and associated data storage devices operating one or more databases associated with and/or operated by one or more of the service provider computer(s) 110, the financial institution computer(s) 120, the delivery agent computer(s) 130, the subscriber computer(s) 140, and/or the payee computer(s) 150. The memories and other data storage devices can be in communication with each other and/or other central memories and other data storage devices. When needed, data or information stored in memory or a data storage device may be transmitted to a centralized computer and associated data storage device (e.g., operating a centralized database) capable of receiving data, information, or data records from more than one memory or other data storage devices. In other embodiments, the databases stored in data storage devices shown can be integrated or distributed into any number of data storage devices. In an example embodiment, for security, the service provider computer(s) 110, the financial institution computer(s) 120, the delivery agent computer(s) 130, the subscriber computer(s) 140, and the payee computer(s) 150 may have a dedicated connection to the respective computers and associated data storage devices operating associated databases 119, 129, 139, 149, 159, as shown; though, in other embodiments, the service provider computer(s) 110, the financial institution computer(s) 120, the delivery agent computer(s) 130, the subscriber computer(s) 140, and/or the payee computer(s) 150, or any other entity may communicate with the computers and associated data storage devices operating associated databases 119, 129, 139, 149, 159, or any other data storage device via one or more associated DBMS(s) locally or via a network 160. For simplicity, FIG. 1 illustrates the databases 119, 129, 139, 149, 159 as separate objects; although it is appreciated that each database is a logical collection of data that is stored on a physical computer and controlled and accessed via a DBMS. Accordingly, each of the databases 119, 129, 139, 149, 159 may be stored in a computer, which may be the respective service provider computer(s) 110, the financial institution computer(s) 120, the delivery agent computer(s) 130, the subscriber computer(s) 140, and the payee computer(s) 150, or may be any other computer.

Suitable processors, such as the processors 116, 126, 136, 146, 156 of the service provider computer(s) 110, the financial institution computer(s) 120, the delivery agent computer(s) 130, the subscriber computer(s) 140, and/or the payee computer(s) 150, respectively, may comprise a microprocessor, an ASIC, and/or a state machine. According to various embodiments, one or more of the computers can be configured as a multi-processor computer having multiple processors 116, 126, 136, 146, 156 providing parallel and/or redundant processing capabilities. Such processors comprise, or may be in communication with, media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, flash drive, CD-ROM, DVD, magnetic disk, memory chip, ROM, RAM, EPROM, EEPROM, any other optical media, any other magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language, including, but not limited to, assembly, C, C++, C#, Visual Basic, Java, Python, Perl, JavaScript, GPSS, LISP, and SAS.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Moreover, it will be appreciated that while FIG. 1 illustrates the one or more service provider computer(s) 110, financial institution computer(s) 120, delivery agent computer(s) 130, subscriber computer(s) 140, and payee computer(s) 150 as distinct computers, the functionality of two or more of those computers may be combined. For example, all of the lead time module(s) 111, delivery method module(s) 113, and financial institution application module(s) 123 may be provided by a single computer or system, such as if the financial institution performs some or all of the lead time estimation and delivery method determination functions or if the service provider performs some or all of the check clearing functions. According to another example, the lead time module(s) 111, delivery method module(s) 113, and payee application module(s) 153 may be provided by a single computer or system, such as if the service provider performs some or all of the payment processing functions. According to yet another example, the lead time module(s) 111, delivery method module(s) 113, and delivery agent application module(s) 133 may be provided by a single computer or system, such as if the delivery agent performs some or all of the lead time estimation and/or delivery method determination functions. It is appreciated that the aforementioned combinations are provided for exemplary purposes, and that many variations are available without departing from example embodiments of the invention.

II. Operational Overview—Estimated Lead Time Processing

Embodiments of the invention can provide for determining estimated lead times based upon available mailpiece delivery history information gathered from various distribution centers that deliver to similar geographical areas. According to one embodiment, estimated payment lead times may be used to provide a subscriber with a latest available date for requesting payment based on a due date for the respective payment. According to another embodiment, estimated lead times may generally be associated with various payees, based on the geographical area of the respective payees. By associating estimated lead times with payees, subscribers can be provided with estimated receipt dates based on a payment request date. In addition, by associating estimated lead times with payees, a service provider can also better understand mailing constraints when mailing paper instruments on behalf of one or more payees. Moreover, better understanding the estimated lead times associated between various distribution centers and geographical areas permits a service provider to select a distribution center, considering the various parameters, such as, but not limited to, payment due date, payment request date, estimated lead time, delivery costs, available delivery methods, and the like. The term "delivery route" is used herein to generally refer to a route between a given distribution center and a given destination geographical area (e.g., zip code or other geographical identifier).

Figure 2:
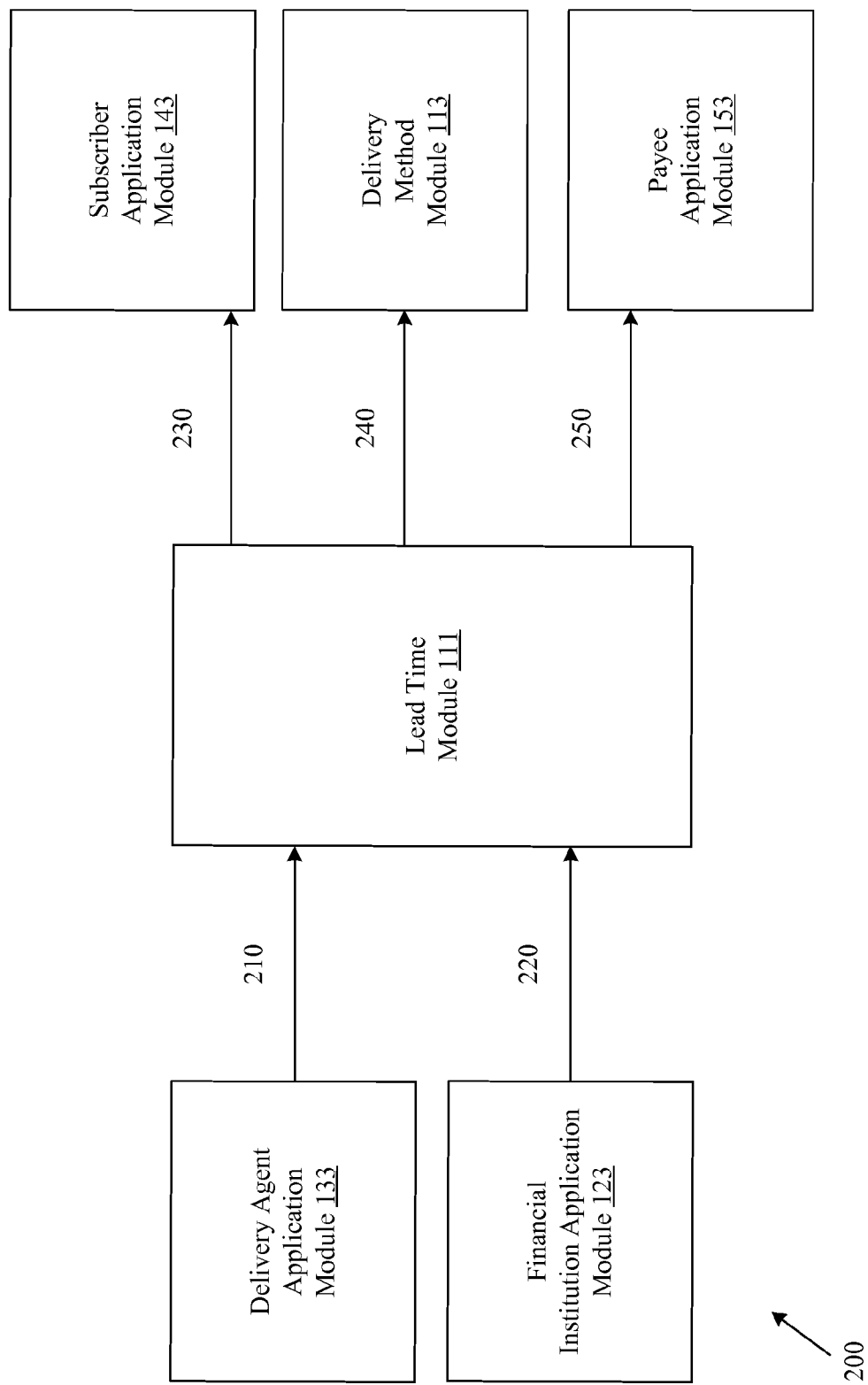
FIG. 2 illustrates a block diagram of an example lead time estimation process, according to an example embodiment of the invention.

FIG. 2 illustrates a block diagram of an example lead time estimation process, according to an example embodiment of the invention. The operation of the block diagram of FIG. 2 will be discussed in conjunction with the flow diagrams of FIGS. 3 and 4.

Figure 3:
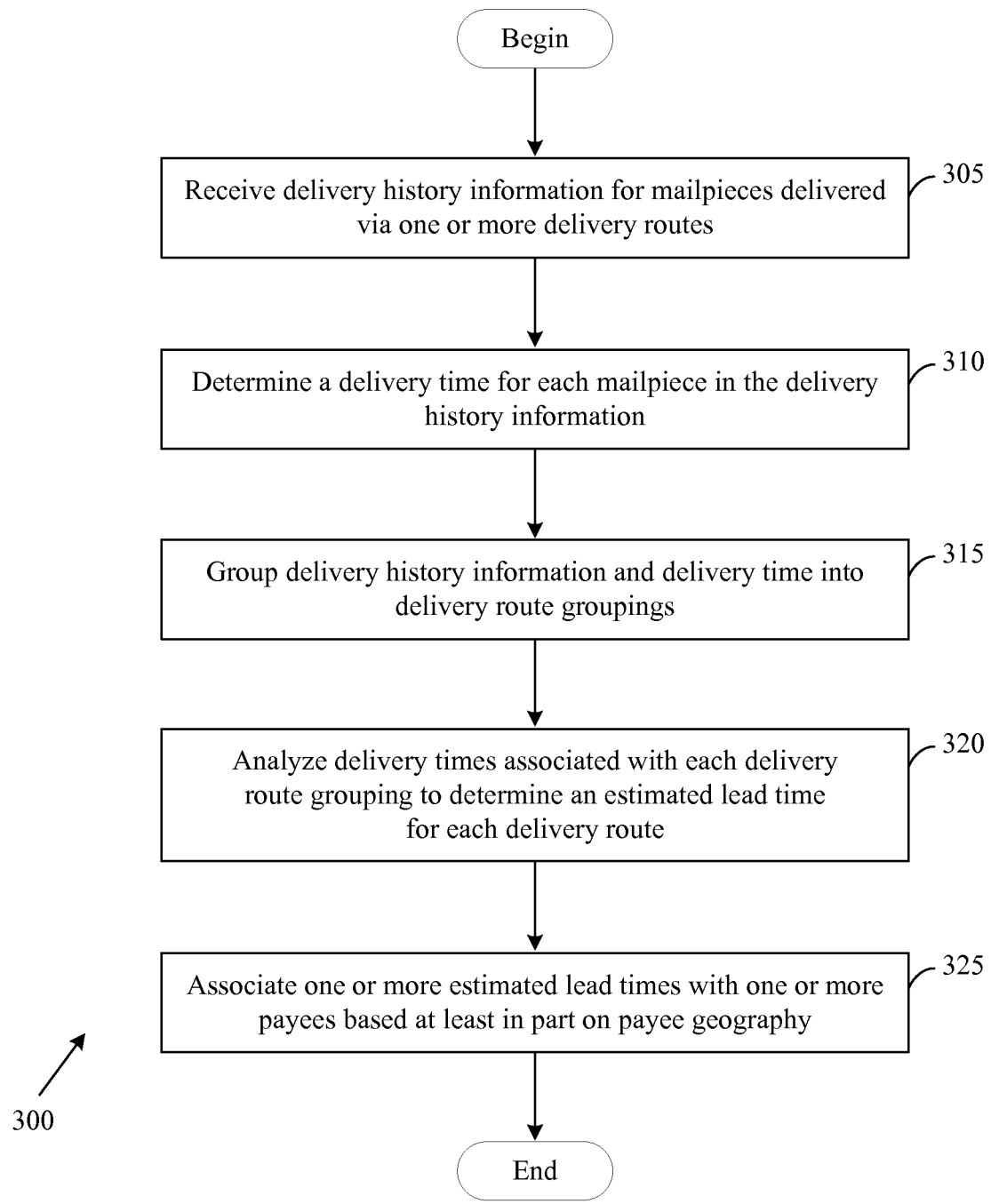
FIG. 3 illustrates a flow diagram of an example process for determining estimated lead times, according to an example embodiment of the invention.

With reference to FIG. 3, a flow diagram illustrates an example method 300 by which estimated lead times are determined by one or more service provider computers, such as the service provider computer(s) 110 and lead time module 111 described with reference to FIG. 1, based upon an analysis of mailpiece delivery history information, according to one embodiment.

The method 300 begins at block 305, in which delivery history information for one or more mailpieces already delivered is received by the service provider computer and its lead time module 111. Delivery history information can include any information associated with one or more mailpieces previously delivered along one or more delivery routes (also referred to herein as "delivery factors"). Delivery history information and associated delivery factors can include information directly associated with the delivery of one or more mailpieces or can be derived from information associated with cleared checks, posted payments, payment history information, and the like, as described herein. Example delivery history information and associated delivery factors can include, but are not limited to, distribution center locations, delivery agents used, delivery routes taken, delivery costs, and delivery priorities. It is appreciated that delivery history information may represent many other delivery factors, and that any delivery factor enabling the analysis of delivery practices can be used.

According to one example, delivery history information includes mailpiece delivery status information 210 received from one or more delivery agent computers, such as via a delivery agent computer 130 and associated delivery agent application module 133 described with reference to FIG. 1. Because mailpiece delivery status information 210 can track any mailpiece, and is not dependent upon what type of account a given paper instrument is drawn, mailpiece delivery status information 210 can be obtained for draft paper instruments drawn on subscribers' accounts and for corporate checks drawn on a service provider's account. Various delivery agents may include, but are not limited to, government postal services (e.g., United States Postal Service, etc.), shipping and delivery services (e.g., United Parcel Service, Inc., FedEx Corporation, DHL Express, etc.), or in-house delivery services (e.g., operated by a service provider, operated by a payee, etc.).

For example, the United States Postal Service ("USPS") provides a service called OneCode Confirm® ("Confirm") by which mailpieces associated with Intelligent Mail® barcodes ("IMB") are tracked through the delivery route by the barcode, and delivery status information is maintained by the USPS. Thus, according to one embodiment, the service provider can associate barcodes with paper instruments being mailed to one or more payees that satisfy the Confirm requirements of the USPS (e.g., service identifier or mailer identifier, sender identifier, etc.) as well as providing unique mailpiece and/or delivery geographical area information for subsequent use by the service provider (e.g., unique mailpiece identifier, routing code indicating delivery address and/or zip code, etc.).

Thus, according to one embodiment, the service provider can store the various identifiers in memory, such as in a delivery history table and/or associated with payment history in the database(s) 119 described with reference to FIG. 1. Upon receipt of the mailpiece delivery status information 210 from the USPS via the Confirm service, the service provider can update the delivery history table (or any other data stored in memory) based on the delivery status information 210. An update to the delivery history table may include identifying at least a mailpiece identifier (which can include a barcode, part of a barcode, or otherwise be associated with a barcode, or any other unique identifier that may be associated with a mailpiece) and a receipt date from the delivery status information 210, then updating the corresponding record in the delivery history table with the receipt date. It is appreciated that in some instances the mailpiece identifier may refer to multiple paper instruments and thus to multiple payments, such as when multiple paper instruments are mailed together in a bundle, and the mailpiece identifier identifies the bundle instead of an individual mailpiece. Moreover, additional data indicating whether the bundle was mailed via an envelope or via a package may also be stored, because that may impact the available delivery methods and corresponding estimated lead times, costs, etc. According to one embodiment, the delivery history table can include, but is not limited to, the mailpiece identifier (e.g., as part of the barcode or any other unique identifier), the sender identifier (e.g., distribution center 01, distribution center 02, etc.), date mailed and/or date printed (these may be the same or different dates), date received, and a geographical identifier (e.g., 3-digit zip code, 5-digit zip code, 9-digit zip code, or 11-digit zip code). An example delivery history table is shown in Table I, according to one embodiment; however, any other table structure and data elements may be used.

TABLE I

| Mailpiece Identifier | Sender Identifier | Mailed/Printed Date | Receipt Date | Geographical Area (e.g., Zip Code) |
|---|---|---|---|---|
| 11111 | 01 | 1/10/XXXX | 1/13/XXXX | 98765-0002 |
| 11112 | 01 | 1/10/XXXX | 1/14/XXXX | 12345-0001 |
| 11254 | 02 | 3/12/XXXX | 3/13/XXXX | 43212-0023 |
| ... | ... | ... | ... | ... |

According to various embodiments, the service provider may also store a payment history table, for example, in the database 119, which may include additional detailed information associated with payment requests processed by the service provider. The mailpiece identifier (or any other unique identifier) may be stored or otherwise associated with one or more corresponding entries in the payment history table, permitting the service provider to associate the delivery status information 210 with the payment history for respective payments and/or to obtain other data elements that may be stored or otherwise associated with the payment history table (e.g., date created, etc.).

According to one embodiment, the delivery status information 210 can be transmitted to the service provider via a periodic batch file process (e.g., daily, twice a day, weekly, etc.) over the network, such as the network 160. However, according to other embodiments, the service provider may be in communication with the Confirm service (or any other delivery agent application module 133 of any other delivery agent) over a network and receive the delivery status information 210 electronically by various means (e.g., a "pull" or "request" interface, message queues, remote procedure call, a web service, etc.). According to yet other embodiments, delivery status information 210 can be received and manually entered into the delivery history table.

While the USPS Confirm service is described in detail, it is appreciated that any other delivery agent may also facilitate the tracking of mailpieces and provide delivery status information 210 by any other means. Moreover, while barcodes are described as being used to represent one or more unique identifiers for tracking mailpieces, any other unique identifiers and/or technologies may be utilized, such as, but not limited to, alphanumeric strings, radio frequency identification ("RFID") technologies, and the like.

According to another embodiment, instead of, or in addition to, receiving delivery status information 210 from one or more delivery agent computers 130 and associated delivery agent application modules 133, the service provider and its associated lead time module 111 can receive check clearance information 220 to determine delivery times. As described above, information associated with corporate checks issued by the service provider and drawn on a service provider's financial account is ultimately transmitted to the service provider after payments have been processed and the corporate checks are cleared. Thus, check clearance information 220 can be transmitted from one or more financial institutions, such as the financial institution computer 120 and associated financial institution application module 123 described with reference to FIG. 1. According to one embodiment, copies of the actual paper instruments are provided by the financial institution to the service provider and contain clearance information printed on or otherwise provided therewith. Check clearance information 220 can be manually entered (or electronically entered, such as by scanning, optical character recognition processing, etc.) into memory, such as a check reconcile table stored in the database 119. According to another embodiment, where the service provider maintains deposit accounts, one or more financial institution computers 120 and associated financial institution application modules 123 can also transmit electronic files with check clearance information 220 to the service provider, thus permitting electronic entry of check clearance information 220 into the check reconcile table. In yet another embodiment, the service provider may analyze payment history information, such as may be stored locally or requested from one or more payee computers 150 and associated payee application modules 153, to determine check clearance information 220 based on the payment history. Check clearance information 220 can include, but is not limited to, a check number, a payee, a date created, and a date cleared. According to various embodiments, the check reconcile table can further include a geographical area identifier (e.g., zip code) like that illustrated in Table I with reference to the delivery history table. Though, in other embodiments, the geographical area information may be obtained based on the payee information, such as in a separate payee table storing payee address information. An example check reconcile table is shown in Table II, according to one embodiment; however, any other table structure and data elements may be used.

TABLE II

| Check Number | Payee | Mailed/Printed Date | Cleared Date | Geographical Area (e.g., Zip Code) |
|---|---|---|---|---|
| 1234 | 01 | 1/15/XXXX | 1/17/XXXX | 54789-0004 |
| 2765 | 02 | 2/12/XXXX | 2/13/XXXX | 19827-0001 |
| 5437 | 04 | 4/01/XXXX | 4/03/XXXX | 54612-0012 |
| ... | ... | ... | ... | ... |

Thus, according to various embodiments, delivery history information can be obtained at block 305 from one or more delivery agents via delivery status information 210 associated with one or more mailpieces and/or from one or more financial institutions via check clearance information 220 associated with one or more paper instruments mailed by the service provider. According to yet another embodiment, payment receipt or posting information could be received electronically from payees that are managed payees (i.e., payees that have an existing arrangement with the service provider and, thus, the ability to electronically transmit payment information) that have received a paper instrument as a payment.

Following block 305 is block 310, in which the delivery time is determined for each mailpiece captured by the delivery history information. According to one embodiment, such as may be performed when analyzing delivery status information 210, the delivery time can be determined by calculating the number of days occurring between the date a paper instrument is mailed (or printed) and the date the same paper instrument is received. For example, according to one embodiment, the delivery time may be calculated as follows: delivery time=date received−date printed/mailed−(non-business days or holidays). Non-business days or holidays may be determined in any manner suitable for each participating entity, such as, but not limited to, maintaining an electronic file or other listing of non-business days or holidays associated with each delivery agent, payee, financial institution, or other participating entity.

According to another embodiment, such as may be performed when analyzing check clearance information 220, the delivery time can be determined by calculating the number of days occurring between the date a paper instrument is mailed (or printed) and the date the same paper instrument is cleared, subtracting a predefined period of time accounting for the typical time between receipt date and clearance date (e.g., 1 day). For example, according to one embodiment, the delivery time may be calculated as follows: delivery time=date cleared−date printed/mailed−1 day−(non-business days or holidays); where the "1 day" is predefined as the period of time between receipt and clearance. According to other embodiments, the "date cleared" may be substituted for another time reference during payment processing, such as, but not limited to, date delivered, date posted or otherwise processed by the payee, etc. For example, the delivery time may be calculated differently when using clearing information instead of delivery information.

According to various embodiments, the service provider or any other entity may provide one or more non-business day and/or holiday calendars to identify and account for such days when calculating the delivery time at block 310. Moreover, because multiple entities associated with the payment processing may identify non-business days or holidays, the lead time module(s) 111 may be operable to reference multiple calendars or other listings when calculating delivery times.

Moreover, according to various embodiments, bundled or batched mailings can be excluded or calculated and maintained independently, since bundled mailpieces may have different delivery characteristics than single mailpieces. As described above, the delivery history table, the check reconcile table, the payment table, or any other table, such as may be stored in the database 119, can include one or more identifiers indicating whether mailpieces were delivered in batch and, if so, how delivered.

Accordingly, upon identifying the respective delivery times for the multiple mailpieces previously delivered, the delivery times can be associated with each mailpiece and stored in the respective data tables (or in any other memory).

Following block 310 is block 315, in which the delivery history information is grouped into multiple delivery route groupings. According to various embodiments, the delivery route grouping can be defined according to different characteristics. For example, a delivery route grouping may simply represent delivery mailpieces delivered to the same or similar geographical areas. Or, in a more specific definition, a delivery route grouping may represent mailpieces delivered to the same or similar geographical area from the same or similar origination point (e.g., the same distribution center), or a delivery route grouping may also consider an indication of the path taken, the delivery method utilized, and/or any other characteristic that may geographically define past mailpiece delivery. It is appreciated that the delivery route grouping can be user definable, permitting flexibility for different needs.

According to one embodiment, similar geographic areas may be indicated by the USPS zip code (e.g., 11-digit type, 9-digit type, 5-digit type, and 3-digit zip code type). The 9- or 11-digit zip code types can identify a specific delivery address, and thus a single payee. A 5-digit zip code type defines a larger geographic area in which multiple addresses (i.e., multiple payees) are located. Typically, a 5-digit zip code reflects a particular post office's delivery territory. A 3-digit zip code type defines an even broader geographic area capturing more addresses than the others. As an example, a 3-digit zip code of "200" includes all addresses in the 5-digit zip code of "20008," which includes all the addresses in the 9-digit zip code of "20008-0002" and the 11-digit zip code of "20008-0002-68." It is appreciated that USPS zip code conventions are provided for illustrative purposes only, and that any other postal code or address identifier may be used to define geographical areas. The delivery times determined at block 310 can thus be grouped into delivery route groupings defined according to various levels of granularity, based upon the geographical area identifier used to define the delivery route. For example, according to one embodiment, delivery times can be grouped by delivery routes defined by one or more of the 11-, 9-, 5-, and 3-digit zip code types, such that the zip code type used to identify the grouping will determine the level of granularity. As one example, using a 5-digit zip code type will provide a more granular delivery route grouping (smaller delivery area) than a 3-digit zip code type (capturing a greater area by encompassing multiple 5-digit zip codes).

Following block 315 is block 320, in which the delivery times can be analyzed by the lead time module 111 for each respective delivery route to determine an estimated lead time for each delivery route. As an example, the service provider may have at least two distribution centers from which it mails paper instruments to payees. Thus, for each geographical area at least two delivery routes may be analyzed—one from a first distribution center to the geographical area, and a second from the second distribution center to the same geographical area. It is appreciated that any number of delivery routes to a given geographical area can be provided (e.g., more than two distribution centers mailing to the same zip code), though, two are used herein for exemplary purposes.

When analyzing delivery time information, various factors can be considered before arriving at the final estimated lead time for each delivery route. For example, the stored delivery times can be analyzed to determine whether there is sufficient volume of delivery history information collected over a given period of time to provide meaningful, accurate, reliable estimated lead times. In another example, the distribution of delivery history information can be analyzed and pre-processed to identify outliers in the data history and to avoid excessive variance in the delivery time data captured. In another example, seasonal variation, such as busier mailing activities during certain periods in the year (e.g., holidays, tax time, etc.), can be accounted for.

According to one embodiment, one aspect of the analysis performed at block 320 may include determining whether there is sufficient volume over a certain period of time. In one example, the lead time module 111 may be configured to require a certain number of calculated delivery times for each delivery route within a predefined number of days (e.g., at least 1,000 data points over the past 30 days, or an average of 1,000 data points each month for the past four months, or at least 200 data points per week for the past four weeks, etc.). It is appreciated that various considerations and conditions may be accounted for and configured into the lead time module 111 to determine what volume of data would provide meaningful results or a desired confidence level. In one example, different requirements may exist for relying on different delivery route groupings (e.g., selecting between 3-digit, 5-digit, 9-digit, or 11-digit zip codes). Moreover, any of the parameters and characteristics can be reviewed and easily changed over time, depending upon the need, and can vary between processing tasks.

According to another embodiment, one aspect of the analysis performed at block 320 may include analyzing the distribution of data points gathered. For example, after determining that there is a sufficient volume of data, the lead time module 111 may be configured to perform a statistical analysis on the delivery time data to determine whether the delivery time data may provide an estimated lead time within a desired confidence level. The lead time module 111 can be configured to perform various statistical and distribution analysis techniques, including, but not limited to, chi-square analysis, mode analysis, mean analysis, Monte Carlo analysis, and the like. For example, according to one embodiment, the mode of all delivery time data captured may be used if the number of delivery time data points with a value less than or equal to the mode amounts to at least X % of the total number of delivery time data points (where X % can be varied, based on the level of confidence desired). It is appreciated that these analysis techniques are provided for illustrative purposes, and that any analysis techniques may be performed by the lead time module 111 to estimate, predict, or otherwise identify lead times, according to other embodiments of the invention. Moreover, the parameters used, such as the confidence level, the number of data points, etc., can be altered over time, and can vary between processing tasks The lead time module 111 can be configured to perform the estimated lead time analysis at block 320 in response to various triggering events. According to one embodiment, the estimated lead time analysis can be performed periodically, such as bi-weekly or monthly. According to another embodiment, the estimated lead time analysis can be performed on a rolling basis, such that it is constantly (or on a more frequent basis) performing the analysis and updating the estimated lead times. According to yet another embodiment, the lead time module 111 can be configured to perform the estimated lead time analysis upon receiving a predefined new volume of delivery history information (e.g., from one or more delivery agents and/or financial institutions) for a given delivery route.

According to one embodiment, the delivery time data for a single mailpiece can be associated with multiple delivery routes at differing levels of granularity, such as by grouping delivery times by 5-digit zip code types as well as 3-digit zip code types. While delivery times may be grouped by 9- or 11-digit zip codes, doing so presumably may capture only a single recipient.

Accordingly, upon performing the analysis at block 320, the service provider can identify an estimated lead time for each delivery route. The estimated lead times for each delivery route can be stored in a geographical area table, such as in the database 119, identifying the estimated lead times per delivery route for each geographical area analyzed. An example geographical area table is shown in Table III, according to one embodiment; however, any other table structure and data elements may be used.

TABLE III

| Geographical Area (e.g., Zip Code) | Distribution Center 01 Est. Lead Time | Distribution Center 02 Est. Lead Time | ... |
|---|---|---|---|
| 12344 | 2 days | 5 days | ... |
| 12355 | 3 days | 5 days | ... |
| 123 | 2 days | 5 days | ... |
| 56789 | 4 days | n/a | |
| ... | ... | ... | ... |

According to various other embodiments, the estimated lead times stored in the geographical area table (or any other data structure) can be segmented according to various other factors. Example factors may include, but are not limited to, delivery agent used, delivery method used, time of day mailed, day of week mailed, and the like. For example, with reference to Table III, assuming that at least three delivery agents are possible, there may be at least three entries for the delivery route between each zip code and distribution center (e.g., distribution center 01 to zip code 12344 could have three estimated lead times, one for each of the three possible delivery agents). It is appreciated that the number of factors applied to segment estimated lead time data can vary in each embodiment, and may be configurable by the service provider or may be influenced by the options available to respective subscribers, payees, payment request types, etc. (e.g., only certain subscribers may be permitted to have the service provider use expedited delivery methods, etc.). Various delivery methods and additional factors associated therewith are described in more detail with reference to FIGS. 6 and 7 below.

In addition, depending upon the grouping used to define the delivery route, the estimated lead times calculated for one grouping may be different than the other grouping. Thus, the lead time module 111 can be configured to perform conflict resolution when determining which estimated lead time to apply. According to one example, the lead time module 111 can be configured to accept a more granular grouping (e.g., use the estimated lead time calculated by grouping based on a delivery route defined to a 5-digit zip code type as compared to one defined to a 3-digit zip code type), because that may be more indicative of any delivery characteristics specific to that particular area. According to another example, the lead time module 111 can be configured to accept a larger grouping if the smaller grouping does not have a sufficient volume of delivery time data (e.g., not enough previous mailpieces delivered to the 5-digit zip code to provide the desired level of confidence).

Following block 320 is block 325, in which estimated lead times can optionally be associated with payees based on their geographical location and/or other factors. According to one embodiment, after having determined the estimated lead time for each respective delivery route analyzed at block 320, estimated lead times can be associated with different payees to whom the service provider mails paper instruments based on the geographical area of each respective payee, and stored in a payee estimated lead time table in memory, such as in the database 119, and/or stored in or associated with any other table (e.g., payee table, etc.). Creating a payee estimated lead time table can permit the service provider to display estimated lead times to subscribers, such as may be presented in an electronic bill presentment and payment application, as further described with reference to FIGS. 4A-4B and 5A-5C. A payee estimated lead time table can also permit the service provider to better schedule printing and mailing of paper instruments upon receipt of a payment request transaction. Additional details of associating an estimated lead time with one or more payees is described in more detail with reference to FIGS. 4A-4B.

The method 300 can end after block 325, having processed delivery history information to analyze delivery times and determine estimated lead times for various delivery routes. It is appreciated that the various steps illustrated by the blocks in FIG. 3 do not have to be performed together or by a single software module, but instead may be performed via multiple separate processes. For example, delivery history may be received at block 305 as a function of receiving or "pulling" information from an external party, while determining delivery time for each mailpiece at block 310 may be performed in conjunction with the step at block 305 or in conjunction with grouping delivery history and time information into delivery route groupings at block 315. Moreover, one or more of these functions may be performed as a result of a time or sequential trigger, or as a result of a predefined volume of data being gathered.

Figure 4A:
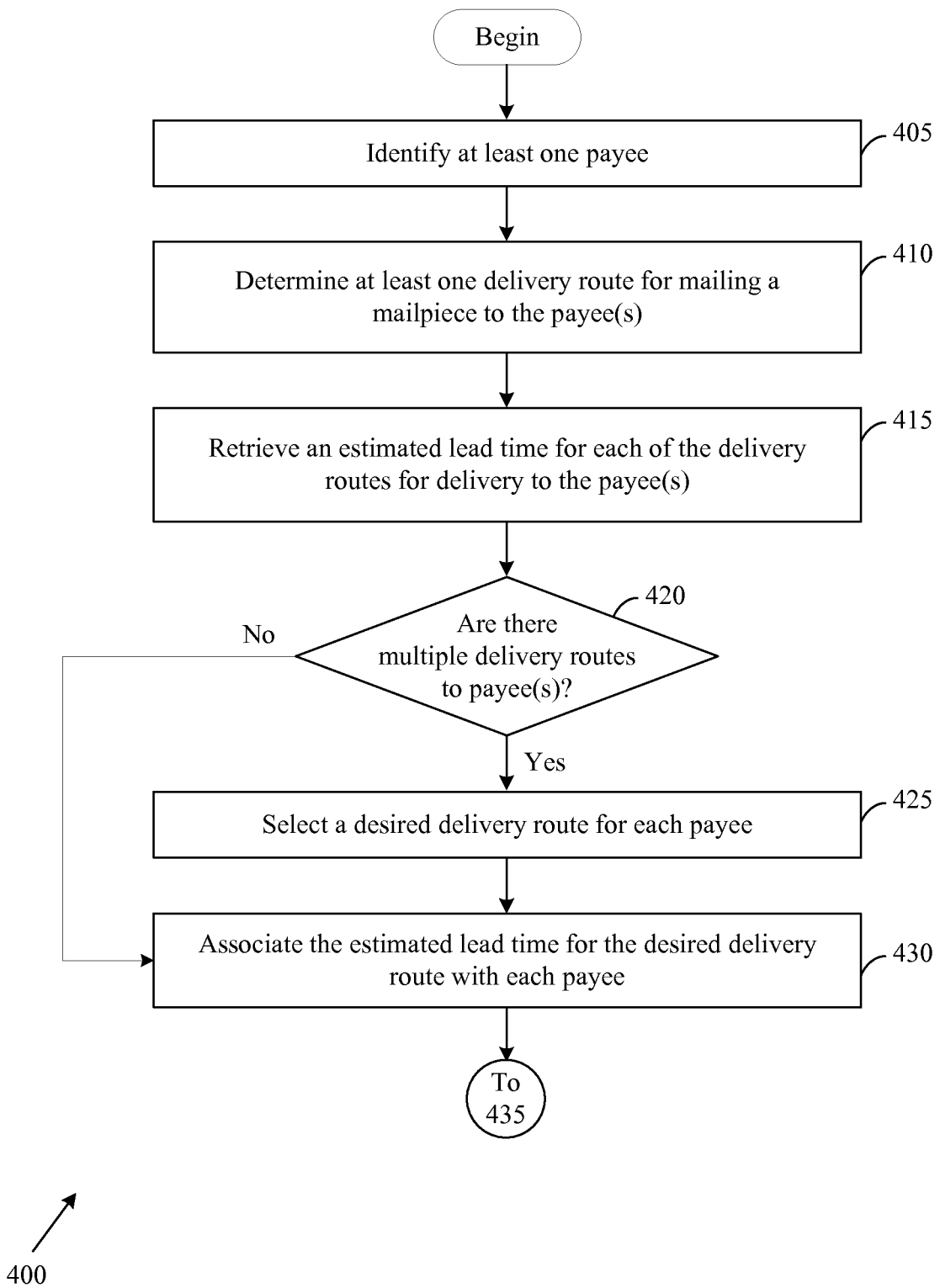
FIGS. 4A-4B illustrate a flow diagram of an example process for determining estimated lead times and presenting or associating estimated lead times with payees or other recipients, according to an example embodiment of the invention.
Figure 4B:
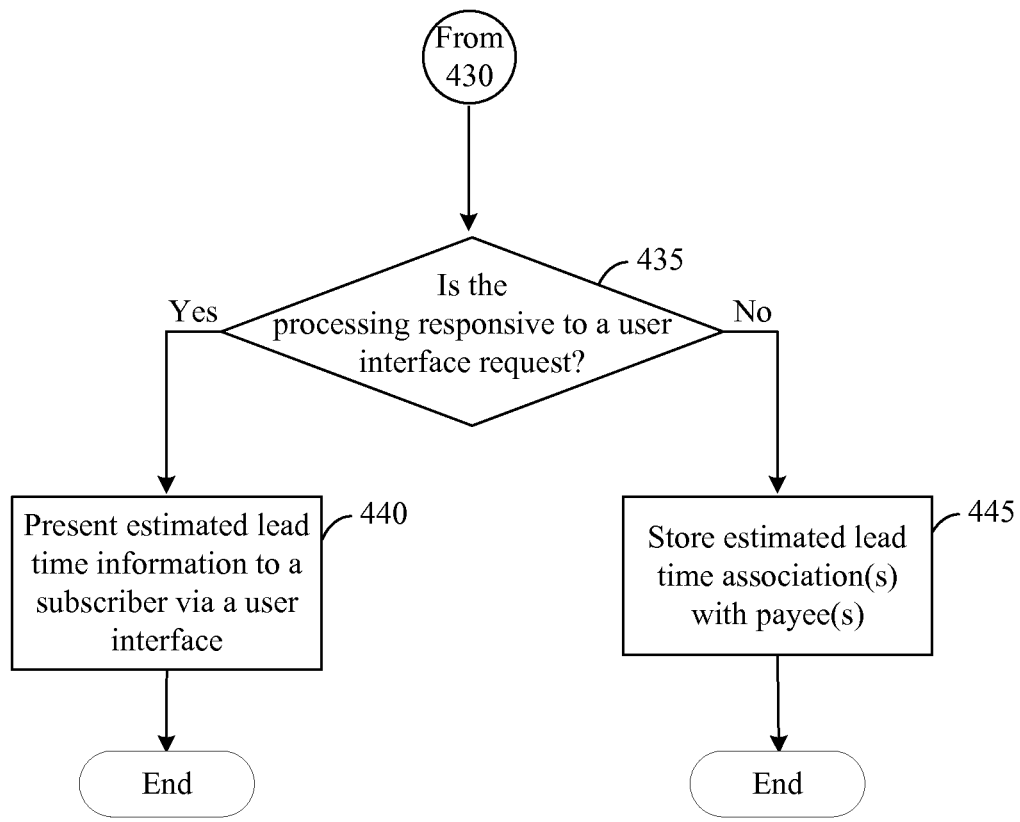

Turning to FIGS. 4A-4B, after estimated lead times have been determined, the one or more service provider computer(s) 110 and associated lead time module 111 can associate estimated lead times 230 with payees, such as to permit presenting the information to subscribers or otherwise using the information during payment processing, according to one embodiment of the invention. Estimated lead times 230 can be presented and/or used when presenting payment options to subscribers, such as when the subscriber application module 143 is utilized to interface with an electronic bill presentation and payment application provided by the service provider. For example, by using a more accurate estimated lead time, a service provider can indicate, for payment to a particular payee, an earliest possible payment receipt date or, conversely, a latest possible payment request submission date to ensure payment receipt by a certain date. Or in another example, a service provider can display the estimated lead times 230 (or delivery times) for a list of payees. According to various embodiments, these and other features can be made available by a service provider based at least in part on the estimated lead times calculations as described with reference to FIG. 3.

Still with reference to FIGS. 4A-4B, the method 400 begins at block 405, in which the lead time module 111 can identify at least one payee to which an estimated lead time can be associated. According to one embodiment, a value based on an estimated lead time associated with a payee may be presented responsive to receiving a request from a subscriber interfacing with an electronic bill presentment and payment application for a particular transaction user interface (e.g., a request to add a new payee or submit a new payment request). According to another embodiment, one or more payees may be identified independent of a subscriber's request, but as a result of asynchronously processing mailpiece delivery history information for associating one or more estimated lead times apart from processing a particular payment, such as is described with reference to block 325 of FIG. 3. Accordingly, at block 405, the lead time module 111 of the service provider may identify one or more payees with which an estimated lead time is to be associated.

Following block 405 is block 410, in which the lead time module 111 is operable to determine at least one delivery route associated with the payee(s) identified at block 405. As described, the delivery routes are defined by the distribution center and the geographical area associated with the delivery address. According to one embodiment, the lead time module 111 can be configured to retrieve payee delivery address information from previously stored payee information, such as in managed payee data or the subscriber's personal payee data stored in the database 119 described with reference to FIG. 1. According to another embodiment, payee delivery address information can be provided as part of the payment request received from the subscriber. According to other embodiments, payee information, such as delivery address information, can be retrieved from any other data source, including, but not limited to, from the subscriber, directly from the payee, from a financial institution associated with the payee or subscriber, or from a third party source. Upon retrieving the payee's delivery address information, the geographical area, and thus the various available delivery routes, associated with the delivery address can be determined. If the delivery routes are defined by zip code, the payee's zip code can be extracted to identify the payee's geographical area. In other embodiments, the geographical area may be defined differently, such as any other address identifier.

Upon identifying the payee's corresponding geographical area, at least one delivery route can be identified for the payee. According to various embodiments, one or more delivery routes to the payee's geographical area exist, for example, between one or more distribution centers (or other sender locations) and the payee's zip code. As an example, with reference to Table III above, two delivery routes to zip code 12344 exist—a first delivery route from Distribution Center 01, and a second delivery route from Distribution Center 02. In other examples, only one delivery route may exist, such as if only one distribution center mails to a given geographical area. In yet other examples, more than two delivery routes may exist, such as if there are more than two distribution centers available for mailing to a given geographical area. According to other embodiments, as described more fully with reference to FIGS. 6 and 7, different delivery methods may also be identified at block 410, which may affect the delivery route and/or the estimated lead times determined (e.g., different available delivery agents, different transportation means, different priority services, alternate delivery paths, etc.).

After having determined the delivery route(s) associated with each payee at block 410, block 415 follows, in which estimated lead times for each delivery route are retrieved, as described with reference to FIG. 3.

Following block 415 is decision block 420, in which it is determined whether multiple delivery routes were identified at block 410 as being available for delivery to the payee(s) identified. If multiple delivery routes are identified for a payee, then block 425 follows, in which the desired delivery route is selected from those identified. According to one embodiment, the lead time module 111 can be configured to select the delivery route associated with the shortest estimated lead time as the desired delivery route.

Having determined the desired delivery route at block 425, block 430 follows in which the estimated lead time associated with the desired delivery route is associated with the respective payee. In addition, if it is determined at decision block 420 that only a single delivery route is available for delivery to the payee(s) identified, then block 430 follows. According to one embodiment, the lead time module 111 can be configured to associate the estimated lead time for the desired delivery route selected at block 425 with each of the respective payees identified. The lead time module 111 may store the association in memory, either temporarily, such as if only for transmitting or otherwise presenting to a subscriber, or for longer durations, such as if storing the association in a database, such as the payee table or the payee estimated lead time table in the database 119, or otherwise associated with managed payee or personal payee data, for subsequent access.

Following block 430 is decision block 435, in which it is determined whether the estimated lead time processing performed is in response to a user interface request (e.g., from a subscriber) or as a result of asynchronous processing.

If it is determined at decision block 435 that the lead time processing is being performed in response to a user interface request, then block 440 follows, in which the information is presented via a user interface. Otherwise, block 445 follows, in which the estimated lead time associations with the payee(s) are stored.

In response to a user interface request, block 440 follows, in which the payee estimated lead times 230 associated with one or more of the payees, or one or more values based on the lead times, are transmitted or otherwise presented to a subscriber, such as presented via a user interface, as described in more detail with reference to FIGS. 5A-5C. As described, estimated lead times for one or more payees can be determined responsive to a variety of user interface requests. Thus, estimated lead times can be transmitted or otherwise presented to a subscriber in a number of ways, examples of which are described herein.

According to one embodiment, upon accessing a user interface of an electronic bill presentment and payment application displaying a list of one or more payees associated with the subscriber (e.g., a payee list), an estimated lead time is presented for each payee in the list at block 440. For example, when generating the user interface containing the list of one or more payees, the steps of the method 400 can be performed by the lead time module 111 for each payee, and the resulting estimated lead time for the desired delivery route can be presented to the subscriber at block 440. Thus, upon accessing the list of one or more payees, data indicating an estimated lead time (e.g., "n days for delivery", etc.) is presented in association with each payee. Such a list could be presented when processing an "add payment" request for payees already associated with the subscriber. A similar list can be generated and presented as a pick list (e.g., containing managed payees), for example, to permit a subscriber to "add a payee" to the subscriber's list or to otherwise select a managed payee.

According to another embodiment, as a subscriber is selecting or otherwise adding a new payee to a list of payees associated with the subscriber via an electronic bill presentment and payment application, the estimated lead time could be presented to the payee via a user interface. For example, each time a new payee is selected by a subscriber via a user interface, the steps of the method 400 can be performed by the lead time module 111 for the newly selected payee, and the resulting estimated lead time for the desired delivery route can be presented to the subscriber at block 440. Thus, upon identifying a new payee, data indicating the estimated lead time (e.g., "typical estimated delivery time is n days") is presented in association with the newly selected payee.

According to various aspects of these and other embodiments, additional data associated with the payment request may be used when determining the estimated lead time to present to the subscriber. For example, a payment date associated with the payment request may be determined based upon the estimated lead time. In example embodiments, the payment date can be a due date or a process date. If the payment date is a due date, the earliest due date for an on-time payment can be determined based on (1) today's date+(2) the estimated lead time+(3) any non-business days/holidays. If the payment date is a process date and the due date can be identified (e.g., by an electronic bill), then the process date can be set to the latest date that would allow the payment to get there in time, such as (1) the due date−(2) the estimated lead time−(3) any non-business days/holidays.

According to various other embodiments, estimated lead times for respective payees can be presented to a subscriber at block 440 by any other number of techniques. Other example techniques include, but are not limited to, providing an audio response over a telecommunications network (or any other network) via an integrated voice response unit ("IVR") session, presenting a message to a customer service agent for relaying to a subscriber during a live customer service call session, transmitting via an email (or other network-based message), transmitting via a short messaging service ("SMS") message, printing on bills, printing on reminders, and the like.

If, however, it is determined at decision block 435 that the estimated lead time processing is not being performed in response to a user interface request (e.g., it is being performed as part of asynchronous processing), then block 445 follows. At block 445, a payee estimated lead time table (or other representative data) can be generated for storing estimated lead time data in association with one or more payees independent of receiving a subscriber's payment request transaction or bill presentation request. For example, estimated lead time data may be associated with the respective payee and stored in an estimated lead time table for storage in a database, such as the database 119 described with reference to FIG. 1.

Some or all of the steps illustrated for this example method 400 can be performed to asynchronously prepare and store estimated lead time data in association with multiple payees. According to this embodiment, at block 405, one or more payees for which estimated lead times are to be associated can be identified independent of any subscriber request. For example, payees (or other mailpiece recipients) can be retrieved from a database, such as from a payee table, and corresponding address information compared to the geographical area table for determining available delivery routes and corresponding estimated lead times for each of the identified payees. Thus, according to one embodiment, a payee estimated lead time table can include, but is not limited to, payee identifier, payee geographical area (e.g., zip code(s), other address information, etc.), available delivery routes, and estimated lead times for each available delivery route. In various embodiments, the desired delivery route may be selected for each payee and stored in the payee estimated lead time table; though in other embodiments, the desired delivery route is not selected until analyzed with respect to a specific transaction or inquiry.

A payee estimated lead time table can further permit a service provider to make more informed decisions on delivery methods used for each payee when mailing a paper instrument, such as choosing cost effective delivery routes, quickest delivery routes, cost effective delivery agents, quickest delivery agents, and the like. Similarly, according to one embodiment in which delivery history information for bundled mailpieces is analyzed separately from that for individual mailpieces, a service provider may perform an analysis to determine under which circumstances it may be desirable to group paper instruments for bundled delivery instead of individual delivery (e.g., a certain volume of mailpieces along a given delivery route may be quicker and/or more cost effective than individual delivery).

Similarly, according to yet another embodiment, instead of, or in addition to, transmitting estimated lead time information to a subscriber at block 440, estimated lead time information 240 can be transmitted or otherwise accessed by a delivery method module 113 of the service provider for analysis when selecting among various available delivery methods, as described in more detail with reference to FIGS. 6 and 7. Moreover, the functions of selecting a preferred delivery method from various available delivery methods may be coordinated with calculating the estimated lead time module, such that the methods 300 and 400 described with reference to FIGS. 3 and 4 are performed with the method 700 described with reference to FIG. 7.

The method 400 can end after blocks 440 or 445, having associated estimated lead times with one or more payees based on a desired delivery route for delivery to the respective payees and based on lead time estimations performed by analyzing previously delivered mailpieces to the same or similar geographical areas.

Figure 5A:
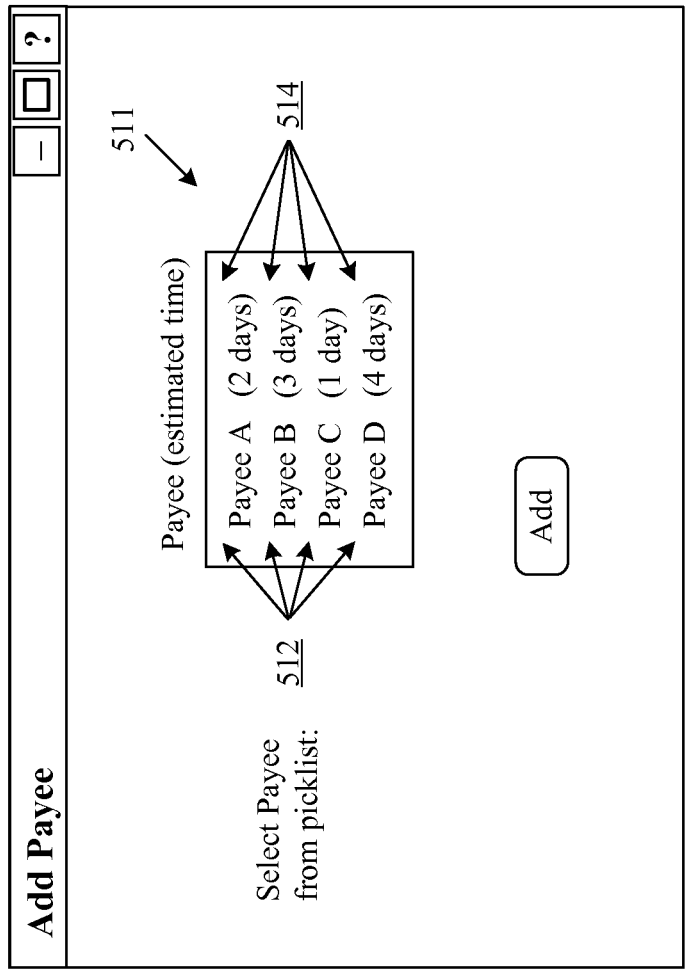
FIGS. 5A-5C illustrate example user interfaces for presenting estimated lead time information to a subscriber, according to an example embodiment of the invention.
Figure 5B:
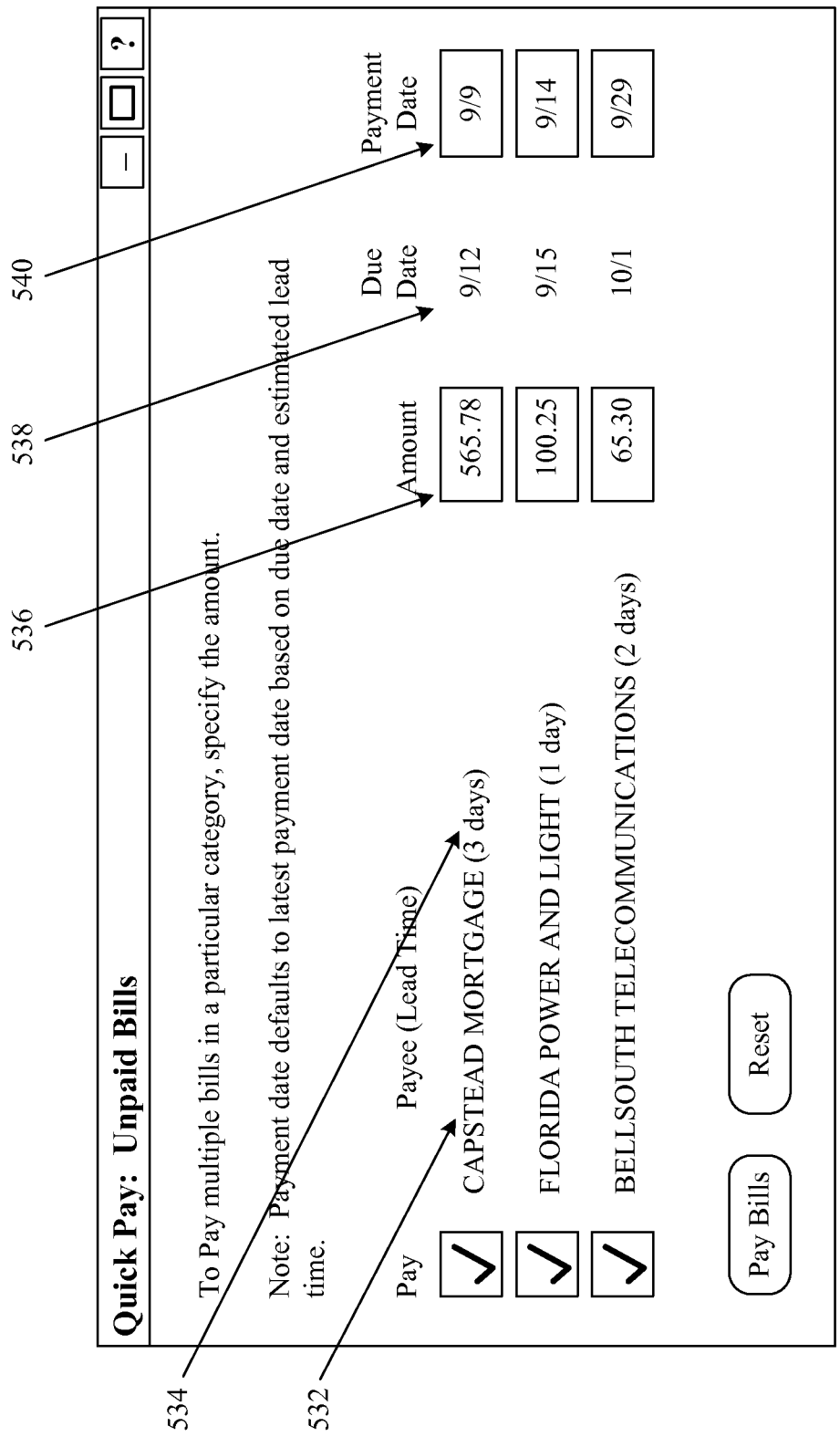
Figure 5C:
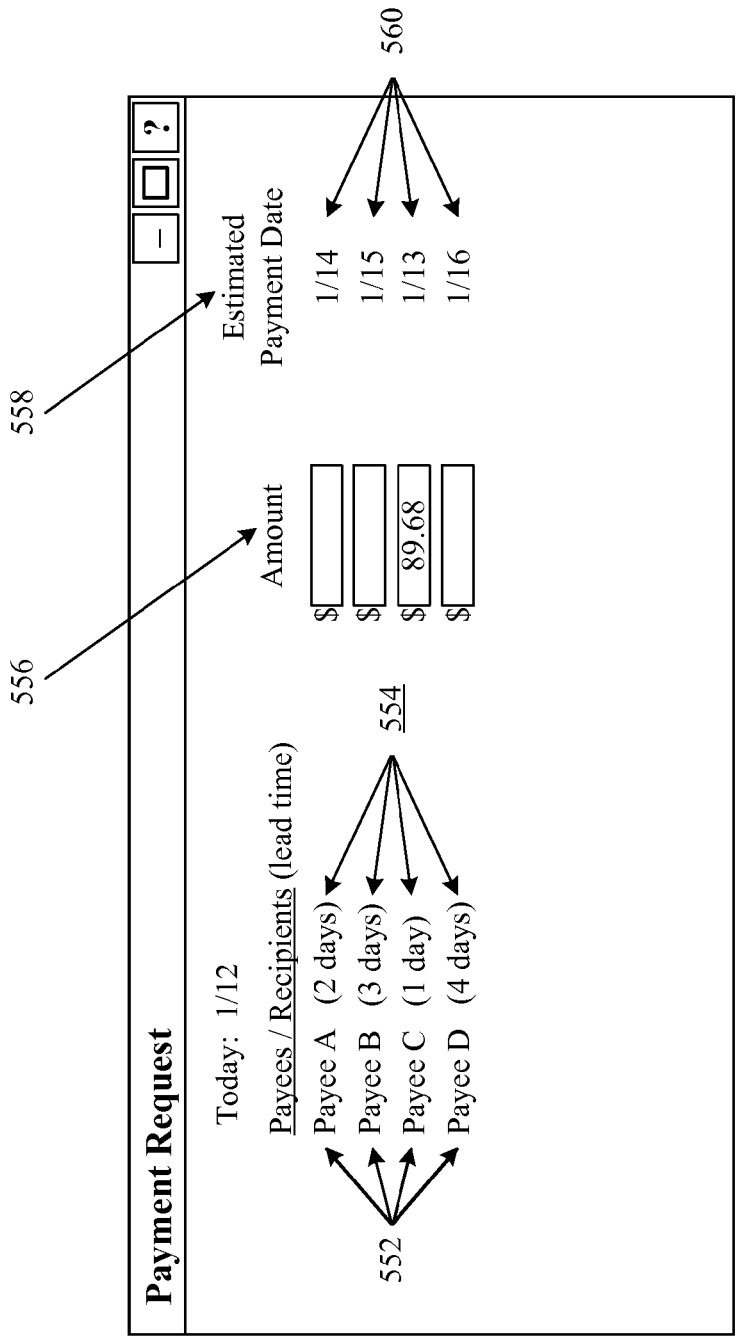

Turning to FIGS. 5A-5C, example user interfaces for presenting estimated lead time data to a subscriber are illustrated. These interfaces are provided for exemplary purposes only, and many other interfaces may be generated and provided to a subscriber when conducting a transaction with a service provider via an electronic bill presentment and payment application. The user interfaces illustrated by FIGS. 5A-5C and further described herein can be displayed by a subscriber's computer, such as a subscriber computer 140 and associated subscriber application module 143 described with reference to FIG. 1. More specifically, the user interfaces may be generated for transmitting to a subscriber's computer over a network, such as the Internet, and displayable in an Internet browser. However, according to various other embodiments, other means for transmitting and presenting a user interface may be employed, such as, but not limited to, via SMS messages, via emails, and the like. According to one embodiment, transaction request and estimated lead time data (and/or other data) are transmitted over a network between the subscriber's computer and the service provider computer, such as to determine estimated lead times by the service provider and to transmit the same for display to the subscriber via a user interface. Though, according to other embodiments, estimated lead time processing can be at least partially performed locally on the subscriber's computer, such as by initially sending geographical area lead time data and/or payee lead time data to the subscriber's computer for subsequent local processing in association with a transaction request or other input by the subscriber.

With reference to FIG. 5A, an example add payee user interface 510 displaying an "add payee" feature including a payee pick list and associated estimated lead times is illustrated, according to one embodiment. Among other features, the payee list user interface 510 can include an add payee list 511 listing payees 512 that can be selected (e.g., managed payees) and an estimated payee lead time 514 associated with each of the payees 512 in the add payee list 511. Accordingly, upon a subscriber accessing the add payee user interface 510 via an electronic bill presentment and payment application, the service provider and its associated lead time module 111 can display payees and associated estimated lead times, as described in more detail with reference to FIGS. 3 and 4, for example. Upon selecting a payee from the add payee pick list 511, a next user interface for continuing the add payee function (e.g., retrieving customer account number, etc.) can be accessed with pre-populated information, such as, but not limited to, the selected payee information and estimated lead time.

FIG. 5B illustrates an example payment request user interface 530 displaying a summary list of one or more unpaid bills and respective payees, indicating an estimated lead time associated with each payee, and providing additional fields for entering payment request transaction data, according to one embodiment. The payment request interface 530 can include a payee list 532 and associated payee estimated lead times 534. The payment request interface 530 can further include an amount entry field 536 (e.g., text box, drop down box, selectable field, auto-populating field, etc.), a due date field 538 (pre-populated in one embodiment, otherwise capable for user entry), and a payment date entry field 540 (e.g., text box, drop down box, selectable field, calendar selection, auto-populating field, etc.) indicating the date payee receives payment.

The amount entry field 536 may default to the amount indicated by electronic versions of each of the indicated bills. In one embodiment, as illustrated, the amount entry field 536 may be capable of accepting a subscriber entry, permitting the subscriber to adjust the amount to be paid for each of the indicated payments. Similarly, the due date field 538 can be automatically populated by the system, based on a due date indicated in electronic versions of each of the indicated bills. However, in other embodiments, the due date field 538 may be capable of accepting a subscriber entry, such as if electronic bill data is unavailable, permitting the user or subscriber to indicate the due date of the bill being paid, which will in turn be analyzed to cause an automatic population of the payment date entry field 540.

According to various embodiments, the payment date entry field 540 can be based at least in part on the value indicated in the due date field 538 and the estimated lead time field 534. For example, in one embodiment, the date indicated in the due date field 538 can cause the automatic population of the payment date entry field 540 with a default value indicating the latest possible payment processing date based on the estimated lead time 534 associated with that payee (e.g., payment date=due date−estimated lead time−(non-business days or holidays)). Thus, the payment request user interface 530 indicates to a subscriber what the latest available payment processing date is for a particular payee based on the estimated lead time data and the due date.

Thus, according to one embodiment, the payment date entry field 540 can default to an automatically calculated latest payment processing date field (based on the due date for the respective bill and the estimated lead time for the corresponding payee). The payment date entry field 540 can also be capable of accepting a subscriber entry, such that a subscriber may override the default payment processing date. In one embodiment, the payment request user interface 530 may prevent a subscriber from entering a date later than the calculated latest payment date (based on the due date for the respective bill and the estimated lead time for the corresponding payee). For example, a calendar selection field may only have dates equal to or earlier than the calculated latest payment processing date, or a text box may generate an error message or warning indicating when a selected date is after the calculated latest payment processing date. In other embodiments, however, the payment request user interface 530 may permit a subscriber to enter a later date, though, a warning or other message may be generated indicating that the date is after the calculated latest payment date and that the payment may not be completed on or before the due date.

With reference to FIG. 5C, another example payment request interface 550 is illustrated, according to one embodiment. As illustrated by this embodiment, the payment request interface 550 can include a payee list 552, associated estimated lead times 554, and amount entry fields 556, similar to that described with reference to FIG. 5B. Though, according to this embodiment, an estimated payment date field 558 is operable to display estimated payment dates 560 indicating the earliest estimated payment dates for each payee based on the estimated lead times 554 and the current date (e.g., estimated payment date>=current date+estimated lead time+(non-business days or holidays)). In one example embodiment, the estimated payment date field 558 can be edited by the user, such that only days that are on or after the earliest estimated payment date can be entered (or otherwise selected, such as from a selectable calendar function, etc.) for populating the estimated payment date field 558. Thus, according to this embodiment (and that illustrated by FIG. 5B), the payment request interface 550 permits a subscriber to more strategically schedule payments based on estimated lead times. Doing so can allow a subscriber to more effectively manage account balances, time payment dates, avoid late payments, and the like. It is appreciated that while the entry field is described as a text entry field, according to other embodiments, any entry field can be provided (e.g., selectable calendar, drop down box, selectable field, date field, etc.).

According to various embodiments, the estimated lead time date presented to a subscriber via a user interface can further be adjusted by the lead time module 111 to factor for various delays and/or processing overhead prior to presenting via the user interface. Example factors that may be considered include, but are not limited to, time of day (e.g., payment request entered late in the day may consider the next day as the payment mail date), service provider processing overhead (e.g., service provider volume, printing delays, etc.) that may delay printing and mailing a paper instrument, busy periods (e.g., holiday mailing delays, tax season, etc.), payee delays (e.g., certain payees may not process payment until the day after receipt), and the like. Accordingly, as part of the estimated lead time processing described with reference to FIGS. 3 and 4 and/or as part of the generation and presentation of one or more user interfaces described with reference to FIGS. 5A-5C, additional time may be added to estimated lead times presented and/or estimated payment dates calculated.

In one example, estimated lead times may be used by a service provider after determining that a payment request requires a paper instrument be printed and mailed instead of being issued electronically, which may occur after a subscriber enters the payment request via a user interface. For example, a service provider may begin payment processing a predefined number of days before a target due date, or on a process date designated by the subscriber. Accordingly, by understanding the best estimated lead time, a service provider can identify whether there is variability in the payment schedule, which may allow holding a payment, print scheduling, and the like.

In one example, after a payment request has been submitted to the service provider, additional lead time processing can be performed to determine which day of the week to print and mail paper instruments based on the frequency of processing and the lead time. Accordingly, the service provider can schedule printing and/or mailing on certain days of the week. In one example, a printing/mailing schedule can be generated based at least in part on the estimated lead time analysis, against which the lead time module 111 can compare a subscriber's payment request when scheduling the printing and/or mailing of the corresponding paper instrument(s). Various other processing may be performed by the service provider upon receiving a payment request from a subscriber.

III. Operational Overview—Delivery Method Selection

Other embodiments of the invention may provide for selecting one of multiple available delivery methods for mailing one or more mailpieces to a recipient, based at least in part on delivery history information for mailpieces delivered to the same geographical area as the recipient in a manner similar to that described above. For example, according to an embodiment in which the mailpiece recipient is a payee, the various delivery methods available for delivering the mailpiece to the payee are identified. Each delivery method can be characterized at least in part by one or more of the distribution centers from which the paper instrument is to be mailed (e.g., the delivery route as described with reference to FIGS. 3-4), the delivery agent used for delivery (e.g., USPS, UPS, FedEx, DHL, in-house transportation, etc.), or any other factor distinguishing the various available delivery methods (e.g., transportation means, priority services, etc.). In addition to the mechanics for effecting delivery, additional data can be associated with each available delivery method, such as an associated calculated estimated lead time, to further facilitate a service provider in selecting a delivery method. Other additional data and factors can be considered when selecting a preferred delivery method for delivering mailpieces to the payee, such as, but not limited to, delivery costs, subscriber status and access to various delivery methods, existing relationship and arrangements with various delivery agents, distance traveled, etc. Upon selecting a preferred delivery method, an association can be stored or otherwise maintained between the payee and the selected delivery method, permitting the service provider to retrieve and/or analyze this information when performing subsequent delivery processing for the given payee.

Figure 6:
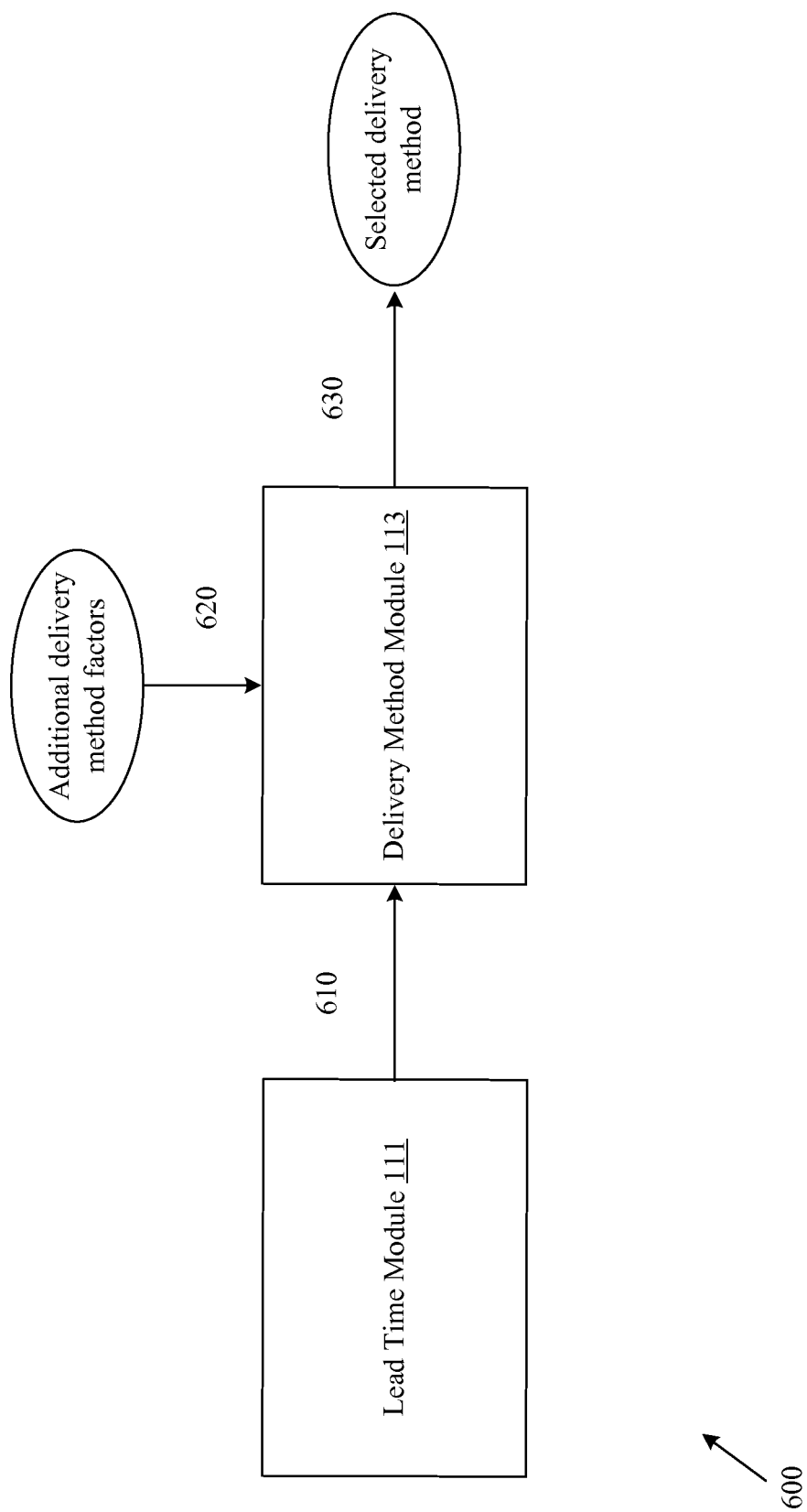
FIG. 6 illustrates a block diagram of an example delivery method selection process, according to an example embodiment of the invention.

FIG. 6 illustrates a block diagram of an example delivery method selection process, according to an example embodiment of the invention. The operation of the block diagram of FIG. 6 will be discussed in conjunction with the flow diagram of FIG. 7. It is also appreciated that, according to one embodiment, the method 700 can be performed in association with the example method 400 such that some of the steps may be shared between the methods. For example, the available delivery routes and delivery methods may be determined concurrently, after which the additional factors are determined and analyzed to select the preferred delivery methods and present estimated lead times.

Figure 7:
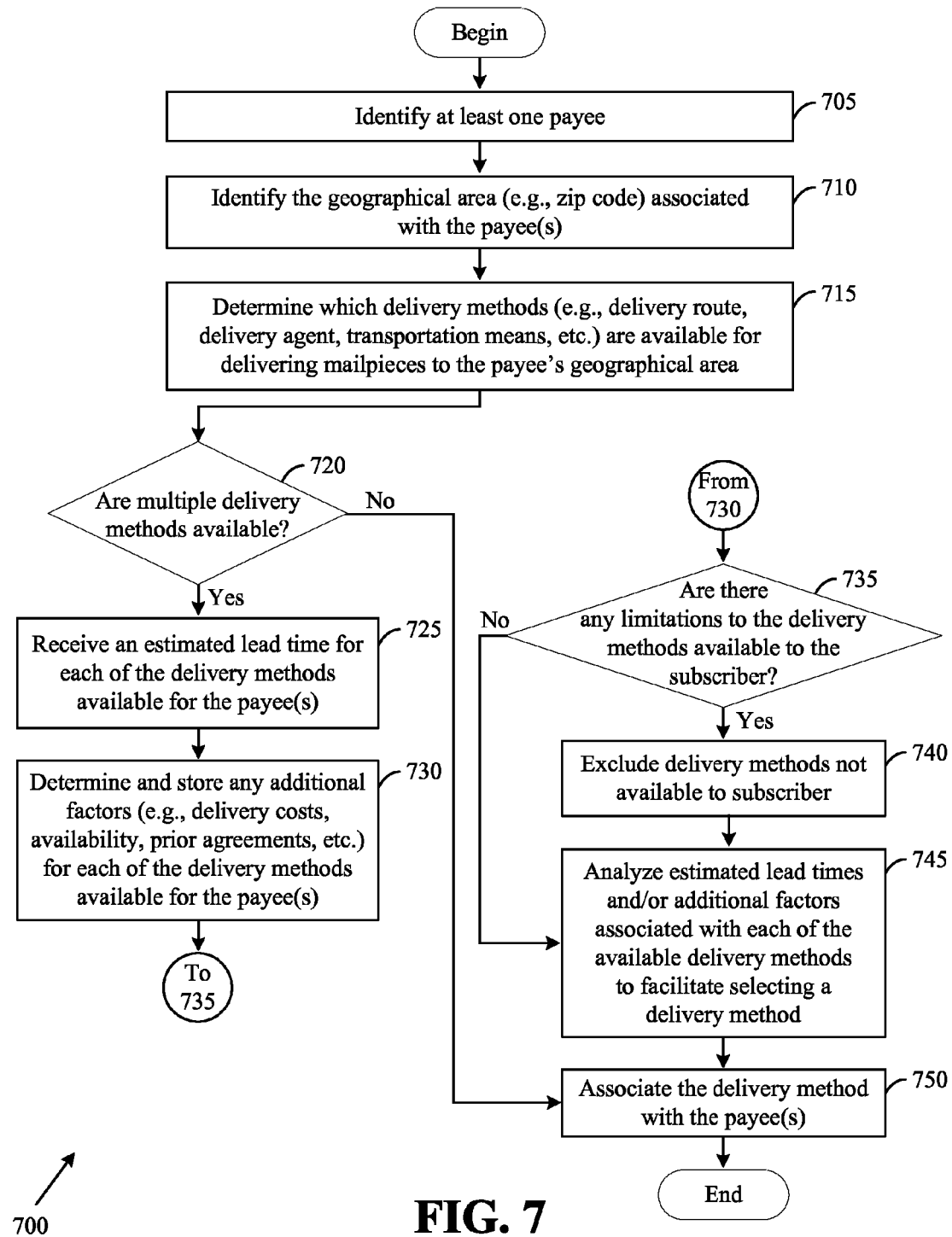
FIG. 7 illustrates a flow diagram of an example process for selecting delivery methods, according to an example embodiment of the invention.

With reference to FIG. 7, a flow diagram illustrates an example method 700 by which a delivery method is selected from multiple available delivery methods by one or more service provider computers, such as the service provider computer 110 and its delivery method module 113 described with reference to FIG. 1, based upon delivery method characteristics and factors, according to one embodiment.

The method 700 begins at block 705, in which at least one payee is identified by a service provider as being a recipient or a potential recipient of a mailpiece, such as a paper instrument mailed as payment on behalf of a subscriber. One or more payees can be identified at block 705 under a variety of circumstances, including responding to a user interface request, or a batch process performed asynchronously and independent of any subscriber activity, such as when selecting a delivery method for multiple payees (like that described with reference to FIGS. 4A-4B). Moreover, in one example, a delivery method may be selected when a payment is being processed by a service provider (or other entity) and after a subscriber has requested payment via a user interface, so as to permit the service provider (or other entity) to identify the delivery method for the given situation.

Following block 705 is block 710, in which the geographical area associated with the payee is identified for delivery. In association with determining that a paper instrument is to be printed and mailed, the service provider can retrieve delivery address information associated with the payee to identify the geographical area (e.g., zip code, as discussed in detail with reference to FIG. 3) where the paper instrument is to be delivered, in a manner similar to that described with reference to block 410 of FIG. 4A, for example.

Following block 710 is block 715, in which the delivery methods available for delivering to the payee's geographical area are identified. For example, for a given geographical area, multiple different delivery methods may be available, based on one or more of: different delivery routes (e.g., different distribution centers for mailing to the same geographical area), different delivery agents, different delivery transportation means (e.g., ground, air, freight, etc.), single or bulk mailings, and/or different delivery priority services (e.g., same day, next day, standard, etc.). According to one embodiment, the service provider may store available delivery methods associated with different geographical areas in memory, such as in a delivery method table in the database 119. An example delivery method table can include, but is not limited to, geographical area identifiers (e.g., zip codes) and the available delivery methods for delivery to each of the geographical areas. An example delivery method table is shown in Table IV, according to one embodiment; however, any other table structure and data elements may be used.

TABLE IV

| geo. area (e.g., zip code) | Del. Agent 01 - Ground | | Del. Agent 01 - Air | | Del. Agent 02 - Ground | | Del. Agent 02 - Air | | Del. Agent 02 - Priority Ground | | |
|---|---|---|---|---|---|---|---|---|---|---|---|
| | Dist. Cent. 01 | Dist. Cent. 02 | Dist. Cent. 01 | Dist. Cent. 02 | Dist. Cent. 01 | Dist. Cent. 02 | Dist. Cent. 01 | Dist. Cent. 02 | Dist. Cent. 01 | Dist. Cent. 02 | ... |
| 12344 | X | X | X | X | X | X | X | X | X | | ... |
| 12355 | X | X | X | X | X | X | X | X | X | | ... |
| 123 | X | X | X | X | X | X | X | X | X | | ... |
| 56789 | X | | X | | X | | X | | X | | ... |
| ... | ... | ... | ... | ... | ... | ... | ... | ... | ... | ... | ... |

As illustrated by Table IV, different geographical areas may have different delivery methods available. In the example illustrated by Table IV, the service provider does not utilize distribution center 02 to deliver to the 56789 zip code. As another example, the priority ground service by the delivery agent 02 is not available from the distribution center 02 for the 3-digit zip code of 123, and thus not for zip code 12344 or 12355. It is appreciated that any number of combinations of delivery methods may be available, and that Table IV is provided for illustrative purposes only. Moreover, it is appreciated that the data as presented in the delivery method table may be combined with other data in one or more other tables, such as estimated lead times data, delivery cost data, and the like. For example, instead of indicating availability or non-availability, an estimated lead time value could be populated only for those available combinations, an estimated cost associated with the delivery method combination could be included, or any combination of these or other data that may facilitate selecting a delivery method.

Thus, according to one embodiment, the delivery method module 113 can be configured to retrieve from the delivery method table (or any other data stored in memory) which delivery methods are available for delivering a paper instrument to the payee's geographical area identified at block 710.

It is appreciated that, while different delivery methods are described in detail as differing by at least one of a delivery route, a delivery agent, transportation means, or priority service, delivery methods can vary by any number of characteristics, according to various embodiments. Accordingly, when identifying delivery methods, such as at block 715, and/or when selecting between multiple available delivery methods, such as is described below, delivery methods are not limited to the illustrative variations described herein.

Following block 715 is decision block 720, in which it is determined if multiple delivery methods are available for the payee. If there are, the processing continues to blocks 725 through 750 to select a desired delivery method from the multiple available delivery methods. However, if it is determined at decision block 720 that only one delivery method is available for the payee, then processing skips to block 750 in which the only available delivery method is associated with the payee.

Accordingly, if multiple delivery methods are available, block 725 follows, in which the estimated lead times associated with each of the available delivery methods are received, according to one embodiment. In one embodiment, the delivery method module 113 is configured to receive estimated lead time data 610 from the lead time module 111. According to another embodiment, a delivery method estimated lead time table can be obtained from a database, such as the database 119, for storing estimated lead time data with each delivery method. According to another embodiment, the delivery method table, such as is illustrated by Table IV above, can be updated or otherwise altered to also include estimated lead time data associated with each of the delivery methods for each of the delivery routes. According to another embodiment, instead of, or in addition to, updating the delivery method table, the geographical area table, such as is illustrated by Table III above, can be updated or otherwise altered to include the additional delivery methods (e.g., additional entries for each of the different delivery method combinations, such as agent, transportation means, priority services, etc.). Thus, when initially determining the estimated lead time data, as described with reference to FIG. 3, the lead time module 111 and/or the delivery method module 113 can organize and associate the estimated lead time data according to the various delivery methods. An example delivery method estimated lead time table is shown in Table V, according to one embodiment; however, any other table structure and data elements may be used.

delivery methods). According to various embodiments, additional delivery method factors 620 can include, but are not limited to, delivery agent costs, distribution center costs, other delivery costs, availability of delivery agents, availability of delivery methods based on the corresponding subscriber's status (e.g., certain subscribers may not be permitted to utilize expedited delivery services based on the service level the subscriber is paying for, etc.), availability of delivery methods based on the corresponding payee's status (e.g., certain payees may not accept delivery via certain delivery methods, etc.), prior arrangements with delivery agents (e.g., volume discounts, priority agreements, etc.), time of day, day of week, seasonal delivery trends, and the like. It is appreciated that the aforementioned additional delivery factors are provided for illustrative purposes, and that any additional factor, characteristic, parameter, or requirement may be considered when selecting a preferred delivery method, according to various embodiments.

According to one embodiment, one or more additional delivery method factors 620 are stored and maintained by the service provider (e.g., associated with account data, financial data, payee data, third party contracting terms, etc.), and can be retrieved by the delivery method module 113 at block 730. Though, according to other embodiments, the delivery method factors 620 may be retrieved by the delivery method module 113 from other sources, such as, but not limited to, delivery agents, subscribers, payees, and/or any other third party source.

Moreover, some of the additional delivery method factors 620 captured may be further analyzed by the delivery method module. For example, in one embodiment in which the delivery method factors 620 include delivery costs, the cost data associated with the delivery history information can be analyzed in a manner similar to that described with reference to FIG. 3, such as to determine whether there is sufficient volume of cost data collected over a given period of time, to avoid excessive variance in the cost data captured, to remove outliers, and/or to normalize or otherwise account for seasonal cost variations for comfortably arriving at or otherwise using an average or expected cost associated with each delivery method. For other, non-numerical delivery method factors

TABLE V

| Geo. Area (e.g., Zip Code) | Del. Agent 01 - Ground | | Del. Agent 01 - Air | | Del. Agent 02 - Ground | | Del. Agent 02 - Air | | Del. Agent 02 - Priority Ground | | |
|---|---|---|---|---|---|---|---|---|---|---|---|
| | Dist. Cent. 01 | Dist. Cent. 02 | Dist. Cent. 01 | Dist. Cent. 02 | Dist. Cent. 01 | Dist. Cent. 02 | Dist. Cent. 01 | Dist. Cent. 02 | Dist. Cent. 01 | Dist. Cent. 02 | ... |
| 12344 | 3 | 5 | 2 | 2 | 3 | 4 | 2 | 2 | 2 | | ... |
| 12355 | 3 | 5 | 2 | 2 | 3 | 4 | 2 | 2 | 1 | | ... |
| 123 | 3 | 6 | 2 | 2 | 3 | 4 | 2 | 2 | 2 | | ... |
| 56789 | 4 | | 1 | | 2 | | 2 | | 3 | | ... |
| ... | ... | ... | ... | ... | ... | ... | ... | ... | ... | ... | ... |

Following block 725 is block 730, in which any additional factors associated with each of the available delivery methods are optionally determined and stored for subsequent analysis when selecting a preferred delivery method. For example, in a manner similar to that performed to determine estimated lead times, the delivery method module 113 can be configured to track and store additional delivery method factors 620 associated with the delivery history information corresponding to the same or similar delivery methods for the same delivery route (e.g., multiple previously delivered mailpieces that were delivered to the same geographical area via the same

620, other analysis techniques can be used to most accurately predict what that factor indicates about the associated delivery method (e.g., indicate availability to subscribers and/or payees, priority services, etc.).

Following block 730 is decision block 735, in which it is determined if there are any limitations to utilizing the previously identified delivery methods for the payee. If there are, then block 740 follows, and the delivery methods not available to the subscriber are optionally excluded from subsequent analysis, according to one embodiment.

According to various embodiments, subscribers may be limited to a subset of the otherwise available delivery methods. Various limitations may include, but are not limited to, subscriber account privileges, service level limitations for the customer, and the like. As one example, a service provider may only provide delivery services from a certain delivery agent or priority services to customers paying for, or otherwise receiving, a certain level of service from the service provider, such as may occur with larger institutions or upgraded accounts, for example. Thus, at block 735, the service provider and its delivery method module 113 can be configured to retrieve subscriber information, such as, but not limited to, account information and/or service level information, to identify which delivery methods are not available to the subscriber. The delivery method module 113 is configured to exclude unavailable delivery methods from subsequent analysis when selecting the preferred delivery method.

If there are no limitations to the identified delivery methods, or after various delivery methods are excluded, then block 745 follows. It is also appreciated that, according to other embodiments, the processing at block 745 may not be performed, such as when the method 700 is performed independent of a user interface request.

At block 745 estimated lead time data 610 and/or additional delivery method factors 620 are analyzed to facilitate selecting a delivery method. According to various embodiments, the delivery method module 113 can be configured to input the estimated lead time data 610 and/or any additional delivery method factors 620 to an algorithm to facilitate selecting a delivery method.

As one example, prior to applying the inputs to an algorithm, each of the estimated lead time data 610 and additional delivery method factors 620 may be converted to a numerical score (e.g., ranging from 1 to 5, 1 to 10, 1 to 100, etc.). The algorithm may be created to weight each of the scores, permitting the service provider to prioritize the factors being considered. For example, the service provider may selectively emphasize and de-emphasize one or more of the estimated lead times and additional factors as compared to the other inputs. Thus, upon processing the data associated with each of the available delivery methods, the lowest score (or highest, depending upon the algorithm applied) may indicate the preferred delivery method, at least as determined based on the chosen algorithm. Other means of prioritization may also be utilized.

According to one embodiment, various algorithms may be created and selected for different situations, such as for different subscribers, for different subscriber types, for different payees, for different days of the week, for different economic conditions, and the like. According to another embodiment, the delivery method module 113 may be configured to present delivery options to an operator, such as a prioritized list based on the results of the algorithm, etc., so that the operator can manually select the preferred delivery method.

According to other embodiments, various other techniques may be performed to analyze the estimated lead time data 610 and any additional delivery method factors 620 associated with each of the available delivery methods. For example, other techniques include, but are not limited to, analyzing only estimated lead time, analyzing only one or more of the additional factors (e.g., only based on cost, only based on distribution center, etc.), and the like.

Following block 745 is block 750, in which a preferred delivery method (if there were multiple available delivery methods) is associated with the payee, such as by storing in a payee table of the database 119, a managed payee data repository, a personal payee list, or for presentation via a user interface. It is appreciated that various other techniques can be performed for storing and/or associating the preferred delivery method 630 with one or more payees, one or more geographical areas, one or more delivery routes, one or more subscribers, etc., according to other embodiments.

While the method 700 is described as selecting one of multiple available delivery methods in response to identifying a payee (e.g., receiving a payment request from a subscriber), according to other embodiments, the preferred delivery method 630 can be selected from available delivery methods independent of receiving a payment request transaction to identify a payee. For example, according to one embodiment, some or all of the steps illustrated in this method 700 can be performed to generate or update payee information to indicate the preferred delivery method 630, which can be stored for subsequent processing and analysis. In one example, multiple payees can be identified, and some or all of the steps of the method 700 are repeated for each payee identified. According to another embodiment, some of the steps of the method 700 can be performed to generate or update a delivery method table to indicate a preferred delivery method 630 for delivering mailpieces to each of multiple geographical areas (e.g., preferred delivery method 630 per zip code). For example, instead of identifying a payee, the method 700 can begin with a similar step as performed at block 710, in which one or more geographical areas are identified and some or all of the subsequent steps are repeated for each geographical area. Accordingly, analyzing and selecting a preferred delivery method 630 prior to processing payments and/or preparing mailpieces for delivery enables a service provider to make more informed decisions on delivery methods during subsequent processing.

Moreover, according to various embodiments, the method of selecting a preferred delivery method, as described with reference to FIGS. 6 and 7, can be performed in association with the method of determining estimated lead times. For example, according to one embodiment, before presenting an estimated lead time to a subscriber, if it is determined that multiple delivery methods are available, a preferred delivery method can be selected according to embodiments described with reference to FIG. 7, and the corresponding estimated lead time can be presented to the subscriber according to the embodiments described with reference to FIGS. 4A-4B.

The method 700 can end after block 750, having selected a preferred delivery method from multiple available delivery methods based at least in part on lead time estimations and/or other delivery method characteristics performed by analyzing mailpieces previously delivered to same or similar geographical areas.

Accordingly, as described herein with reference to FIGS. 1-7, embodiments of the invention provide for selecting a preferred delivery method from multiple available delivery methods for delivery to a given geographical area, and for estimating payment lead time associated with the delivery method selected. The selection of a delivery method and the estimation of lead times are accomplished by analyzing delivery history information that includes mailpieces delivered to the same or similar geographical areas and via the same delivery methods. By grouping delivery history information by geographical areas, and optionally by delivery methods, a service provider can analyze greater volumes of data associated with actual deliveries, and thus more accurately predict estimated lead times. In addition, by collecting and analyzing additional delivery method factors, such as delivery costs, in association with the delivery history information collected and analyzed, the service provider can make more informed and intelligent decisions about which delivery method to a given geographical area suits the service provider's requirements and accomplishes its business and economic needs.

While the above description describes embodiments of the invention directed toward printing and mailing paper instruments to payees via a payment service provider, other embodiments of the invention are not limited to payment processing. The systems and methods described herein can be adapted to provide estimated lead times and to select delivery methods in association with the delivery of any mailpiece, not just those associated with payments. For example, where example systems and methods are described as being associated with and/or performed by a service provider performing payment processing functions, any other service provider or other entity may provide embodiments of the systems and perform embodiments of the methods described herein. Also, where transaction processing in association with an electronic bill presentment and payment processing application are generally described, any other application operable to display payment lead times and/or to receive delivery parameters may be provided. In addition, where example methods are described as identifying payees, any mailpiece recipient can be identified and similar lead time and/or delivery method selection performed. Accordingly, it is to be appreciated that the example embodiments described herein are not intended to limit various embodiments of the invention to payment processing and delivery of payment-related mailpieces.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

In certain embodiments, performing the specified functions, elements, or steps can transform an article into another state or thing. For instance, example embodiments of the invention can provide certain systems and methods that transform mailpiece delivery history information representative of actual past mailpiece deliveries from one or more distribution centers to one or more recipients into estimated lead times representative of actual mailpiece deliveries and corresponding documentation, such as print orders, delivery requests, and the like. In another example, embodiments of the invention can provide certain systems and methods that transform mailpiece delivery history information representative of actual past mailpiece delivery methods into a preferred delivery method representative of subsequent deliveries and corresponding documentation, such as print orders, delivery requests, and the like.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A system, comprising:
   at least one memory storing computer-executable instructions; and
   at least one processor configured to access the at least one memory and to execute the computer-executable instructions to:
   process delivery history information associated with a plurality of mailpieces mailed to a geographical area to determine a plurality of delivery times associated with the plurality of mailpieces, wherein each of the plurality of delivery times is associated with a respective one of the plurality of mailpieces, and wherein the delivery history information comprises: (1) delivery status information, and (2) at least one of (i) check clearance information, (ii) payment receipt information, or (iii) payment posting information;
   determine, based at least in part on an analysis of the plurality of delivery times, an estimated lead time associated with subsequent delivery of one or more additional mailpieces to the geographical area;
   identify a payee;
   determine that the payee is associated with the geographical area for mailpiece delivery; and
   associate the estimated lead time with the payee.

2. The system of claim 1, wherein the plurality of mailpieces comprises at least one mailpiece delivered to a recipient other than the payee.

3. The system of claim 1, wherein at least one of the check clearance information or the payment posting information is received from one of (i) a financial institution or (ii) a payee that received a mailed payment associated with one of the plurality of mailpieces.

4. The system of claim 1, wherein the plurality of mailpieces is associated with a plurality of payments, and wherein at least one of: i) the check clearance information, ii) the payment receipt information, or iii) the payment posting information is associated with the plurality of payments.

5. The system of claim 1, wherein the respective delivery time associated with one mailpiece of the plurality of mailpieces is based at least in part on at least one of:
   i) a delivery date, wherein the delivery date indicates a date on which a delivery agent delivered a payment associated with the one mailpiece to a payee of the payment,
   ii) a clearing date, wherein the clearing date indicates a date on which a check associated with the one mailpiece cleared,
   iii) a receipt date, wherein the receipt date indicates a date on which the payee of the payment received the payment, or
   iv) a posting date, wherein the posting date indicates a date on which the payee of the payment posted the payment.

6. The system of claim 1, wherein a mailpiece identifier is associated with one of the plurality of mailpieces and at least a portion of the delivery status information corresponds to the one mailpiece identifier.

7. The system of claim 1, wherein the at least one processor is configured to execute the computer-executable instructions to determine the estimated lead time based at least in part on the analysis of the plurality of delivery times by performing at least one of:
   (i) identifying a mode of the plurality of delivery times;
   (ii) identifying a mean of the plurality of delivery times;
   (iii) identifying a distribution of the plurality of delivery times;
   (iv) performing a chi-square test on the plurality of delivery times; or
   (v) performing a Monte Carlo analysis on the plurality of delivery times.

8. The system of claim 1, wherein the geographical area is associated with a zip code that is associated with one or more corresponding zip code types, and wherein the one or more zip code types comprise at least one of:
   (i) a 3-digit zip code;
   (ii) a 5-digit zip code;
   (iii) a 9-digit zip code; or
   (iv) an 11-digit zip code.

9. The system of claim 1, wherein the geographical area is associated with a first zip code and a second zip code, wherein the first zip code and the second zip code are each respectively associated with different corresponding zip code types, and wherein the at least one processor is configured to execute the computer-executable instructions to determine that the payee is associated with the geographical area by:
   determining that the payee is associated with at least the first zip code and the second zip code,
   wherein the at least one processor is configured to determine the estimated lead time by:
      selecting one of the first zip code or the second zip code, and
      determining an estimated lead associated with the selected zip code, and
   wherein the at least one processor is configured to associate the estimated lead time with the payee by:
      associating the estimated lead time associated with the selected zip code with the payee.

10. The system of claim 1, wherein the at least one processor is further configured to execute the computer-executable instructions to:
   receive a payment request to process a payment to the payee; and
   identify the payee based at least in part on the received payment request, and
   wherein the at least one processor is configured to associate the estimated lead time with the payee by:
      determining a payment mail date for mailing the payment to the payee based at least in part on the estimated lead time associated with the payee.

11. The system of claim 1, wherein the at least one processor is further configured to execute the computer-executable instructions to:
   transmit, for presentation to a subscriber, at least one of:
   (i) the estimated lead time,
   (ii) a payment processing date calculated based at least in part on the estimate lead time,
   (iii) a payment due date calculated based at least in part on the estimated lead time, or
   (iv) a payment mail date calculated based at least in part on the estimated lead time.

12. The system of claim 1, wherein the delivery history information corresponds to first delivery history information associated with a first delivery factor, the plurality of delivery times corresponds to a first plurality of delivery times, the plurality of mailpieces corresponds to a first plurality of mailpieces, and the estimated lead time corresponds to a first estimated lead time, and wherein the at least one processor is further configured to execute the computer-executable instructions to:
   process second delivery history information associated with a second plurality of mailpieces mailed to the geographical area to determine a second plurality of delivery times associated with the second plurality of mailpieces, wherein the second delivery history information is associated with a second delivery factor, and wherein each of the second plurality of delivery times is associated with a respective one of the second plurality of mailpieces; and
   determine, based at least in part on an analysis of the second plurality of delivery times, a second estimated lead time associated with subsequent delivery of the one or more additional mailpieces mailed to the geographical area.

13. The system of claim 12, wherein the first factor and the second factor respectively relate to one of:
   (i) a first distribution center and a second distribution center,
   (ii) a first delivery agent and a second delivery agent,
   (iii) a first delivery route and a second delivery route,
   (iv) a first delivery cost and a second delivery cost, or
   (v) a first delivery priority and a second delivery priority.

14. The system of claim 12, wherein the first factor corresponds to a first distribution center and the second factor corresponds to a second distribution center, and wherein the at least one processor is configured to execute the computer-executable instructions to associate the estimate lead time with the payee by:
   selecting one of the first estimated lead time or the second estimated lead time;
   selecting one of the first distribution center or the second distribution center, wherein the selected distribution center corresponds to the selected estimated lead time; and
   associating the selected distribution center with the payee.

15. The system of claim 1, wherein the plurality of mailpieces and the one or more additional mailpieces are mailed from a same distribution center to the geographical area.

16. The system of claim 1, wherein the at least one processor is further configured to:
transmit, for presentation to a payor, a latest available date to request a payment to the payee based at least in part on the estimated lead time and a payment due date associated with the payment.

17. The system of claim 1, wherein the at least one processor is further configured to:
receive a payment request to process a payment to the payee;
determine a payment mail date associated with the payment based at least in part on the estimated lead time, wherein the payment mail date corresponds to a mail date associated with one additional mailpiece of the one or more additional mailpieces; and
cause at least one of the following to be performed based at least in part on the determined payment mail date:
bundling mailing of the one additional mailpiece with at least one other additional mailpiece, or
delaying the mail date associated with the one additional mailpiece further based at least in part on a payment due date associated with the payment.

18. A method, comprising:
processing, by a service provider system comprising one or more computers, delivery history information associated with a plurality of mailpieces mailed to a geographical area to determine a plurality of delivery times associated with the plurality of mailpieces, wherein each of the plurality of delivery times is associated with a respective one of the plurality of mailpieces, and wherein the delivery history information comprises: (1) delivery status information, and (2) at least one of (i) check clearance information, (ii) payment receipt information, or (iii) payment posting information;
determining, by the service provider system, based at least in part on an analysis of the plurality of delivery times, an estimated lead time associated with subsequent delivery of one or more additional mailpieces to the geographical area;
identifying, by the service provider system, a payee;
determining, by the service provider system, that the payee is associated with the geographical area for mailpiece delivery; and
associating, by the service provider system, the estimated lead time with the payee.

19. The method of claim 18, wherein the plurality of mailpieces comprises at least one mailpiece delivered to a recipient other than the payee.

20. The method of claim 18, wherein at least one of the check clearance information or the payment posting information is received from one of (i) a financial institution or (ii) a payee that received a mailed payment associated with one of the plurality of mailpieces.

21. The method of claim 18, wherein the plurality of mailpieces is associated with a plurality of payments, and wherein at least one of: i) the check clearance information, ii) the payment receipt information, or iii) the payment posting information is associated with the plurality of payments.

22. The method of claim 21, wherein the respective delivery time associated with one mailpiece of the plurality of mailpieces is based at least in part on at least one of:

i) a delivery date, wherein the delivery date indicates a date on which a delivery agent delivered a payment associated with the one mailpiece to a payee of associated with the payment,
ii) a clearing date, wherein the clearing date indicates a date on which a check associated with the one mailpiece cleared,
iii) a receipt date, wherein the receipt date indicates a date on which the payee of the payment received the payment, or
iv) a posting date, wherein the posting date indicates a date on which the payee of the payment posted the payment.

23. The method of claim 18, wherein a mailpiece identifier is associated with one of the plurality of mailpieces and at least a portion of the delivery status information corresponds to the one mailpiece identifier and the one of the plurality of mailpieces.

24. The method of claim 18, wherein determining the estimated lead time based at least in part on the analysis of the plurality of delivery times comprises:
(i) identifying a mode of the plurality of delivery times,
(ii) identifying a mean of the plurality of delivery times,
(iii) identifying a distribution of the plurality of delivery times,
(iv) performing a chi-square test on the plurality of delivery times, or
(v) performing a Monte Carlo analysis on the plurality of delivery times.

25. The method of claim 18, wherein the geographical area is associated with one or more zip code s, wherein each of the one or more zip codes is associated with a respective corresponding zip code type, and wherein the respective corresponding zip code type comprises one of:
(i) a 3-digit zip code type,
(ii) a 5-digit zip code type,
(iii) a 9-digit zip code type, or
(iv) an 11-digit zip code type.

26. The method of claim 18, wherein determining that the payee is associated with the geographical area for mailpiece delivery comprises:
determining that the payee is associated with at least a first zip code and a second zip code associated with the geographical area, wherein the first zip code and the second zip code each have different corresponding zip code types, further comprising:
selecting, by the service provider system, one of the first zip code or the second zip code,
wherein determining the estimated lead time comprises determining an estimated lead time associated with the selected one of the first zip code or the second zip code, and
wherein associating the estimated lead time with the payee comprises associating the estimated lead time associated with the selected one of the first zip code or the second zip code with the payee.

27. The method of claim 18, wherein identifying the payee comprises:
receiving, by the service provider system, a payment request to process a payment to the payee, and
identifying, by the service provider system, the payee based at least in part on the received payment request, and
wherein associating the estimated lead time with the payee comprises determining a payment mail date for mailing the payment to the payee based at least in part on the estimated lead time associated with the payee.

28. The method of claim 18, further comprising:
transmitting, by the service provider system for presentation to a subscriber associated with the service provider system, at least one of:
(i) the estimated lead time,
(ii) a payment processing date calculated based at least in part on the estimate lead time,
(iii) a payment due date calculated based at least in part on the estimated lead time, or
(iv) a payment mail date calculated based at least in part on the estimated lead time.

29. The method of claim 18, wherein the delivery history information comprises first delivery history information associated with a first delivery factor, the plurality of delivery times corresponds to a first plurality of delivery times, the plurality of mailpieces corresponds to a first plurality of mailpieces, and the estimated lead time corresponds to a first estimated lead time, further comprising:
processing, by the service provider system, second delivery history information associated with a second plurality of mailpieces mailed to the geographical area to determine a second plurality of delivery times associated with the second plurality of mailpieces, wherein the second delivery history information is associated with a second delivery factor, and wherein each of the second plurality of delivery times is associated with a respective one of the second plurality of mailpieces; and
determining, by the service provider system, based at least in part on an analysis of the second plurality of delivery times, a second estimated lead time associated with subsequent delivery of the one or more additional mailpieces mailed to the geographical area.

30. The method of claim 29, wherein the first factor and the second factor respectively relate to one of:
(i) a first distribution center and a second distribution center,
(ii) a first delivery agent and a second delivery agent,
(iii) a first delivery route and a second delivery route,
(iv) a first delivery cost and a second delivery cost, or
(v) a first delivery priority and a second delivery priority.

31. The method of claim 29, wherein the first factor corresponds to a first distribution center and the second factor corresponds to a second distribution center different from the first distribution center, and wherein associating the estimated lead time with the payee further comprises:
selecting, by the service provider system, one of the first estimated lead time or the second estimated lead time;
selecting, by the service provider system, one of the first distribution center or the second distribution center, wherein the selected distribution center is associated with the selected estimated lead time; and
associating, by the service provider system, the selected distribution center with the payee.

32. The method of claim 18, wherein the plurality of mailpieces and the one or more additional mailpieces are mailed from a same distribution center to the geographical area.

33. The method of claim 18, further comprising:
providing, by the service provider system to a subscriber associated with the service provider system, a latest available date to request a payment to the payee based at least in part on the estimated lead time and a payment due date associated with the payment.

34. The method of claim 18, further comprising:
receiving, by the service provider system, a payment request to process a payment associated with the payee;
determining, by the service provider system, a payment mail date associated with the payment based at least in part on the estimated lead time, wherein the payment mail date corresponds to a mail date associated with one additional mailpiece of the one or more additional mailpieces; and
causing, by the service provider system, at least one of the following to be performed based at least in part on the determined payment mail date:
bundling mailing of the one additional mailpiece with at least one other additional mailpiece, or
delaying the mail date associated with the one additional mailpiece further based at least in part on a payment due date associated with the payment.

35. A computer-implemented method, comprising:
receiving, by a service provider system comprising one or more computers, delivery history information associated with a plurality of mailpieces, wherein each of the plurality of mailpieces is mailed via a respective one of a plurality of delivery routes to a respective one of a plurality of payees, and wherein the delivery history information comprises: (1) delivery status information, and (2) at least one of (i) check clearance information, (ii) payment receipt information, or (iii) payment posting information;
processing, by the service provider system, the delivery history information to determine a plurality of delivery times, wherein each of the plurality of delivery times is associated with a respective one of the plurality of mailpieces and a respective one of the plurality of delivery routes;
determining, by the service provider system, based at least in part on an analysis of the plurality of delivery times, a plurality of estimated lead times, wherein each of the plurality of estimated lead times is associated with a respective one of the plurality of delivery routes; and
associating, by the service provider system, each of the plurality of estimated lead times with a respective one of the plurality of delivery routes.

* * * * *